(12) United States Patent
Callender et al.

(10) Patent No.: US 10,820,153 B2
(45) Date of Patent: Oct. 27, 2020

(54) TECHNIQUE FOR CONFIGURING A PERIODIC OPERATION IN A WIRELESS COMMUNICATION SYSTEM

(71) Applicant: Telefonaktiebolaget LM Ericsson (publ), Stockholm (SE)

(72) Inventors: Christopher Callender, Kinross (GB); Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 16/089,767

(22) PCT Filed: Mar. 30, 2017

(86) PCT No.: PCT/EP2017/057607
§ 371 (c)(1),
(2) Date: Sep. 28, 2018

(87) PCT Pub. No.: WO2017/167918
PCT Pub. Date: Oct. 5, 2017

(65) Prior Publication Data
US 2019/0116461 A1 Apr. 18, 2019

Related U.S. Application Data

(60) Provisional application No. 62/316,718, filed on Apr. 1, 2016.

(51) Int. Cl.
*H04B 17/336* (2015.01)
*H04L 5/00* (2006.01)
(Continued)

(52) U.S. Cl.
CPC .......... *H04W 4/027* (2013.01); *H04B 17/336* (2015.01); *H04L 5/0048* (2013.01);
(Continued)

(58) Field of Classification Search
CPC ... H04W 4/027; H04W 56/001; H04W 76/28; H04W 36/0088; H04W 24/10; H04W 84/005; H04L 5/0048; H04B 17/336
See application file for complete search history.

(56) References Cited

U.S. PATENT DOCUMENTS

2010/0069083 A1    3/2010  Wei et al.
2013/0258876 A1*  10/2013  Damji ............... H04W 52/0254
                                                        370/252
(Continued)

FOREIGN PATENT DOCUMENTS

CN         1466399 A     1/2004
CN       101453770 A     6/2009
(Continued)

OTHER PUBLICATIONS

International Search Report and Written Opinion of the International Searching Authority, PCT/EP2017/057607, dated Jun. 30, 2017, 12 pages.
(Continued)

*Primary Examiner* — Moo Jeong
(74) *Attorney, Agent, or Firm* — Sage Patent Group

(57) ABSTRACT

At least one periodic operation is configured in a wireless communication system comprising a plurality of wireless devices and a serving network serving the wireless devices. The periodic operation is selectively configurable at one of a shorter periodicity interval and a longer periodicity interval. A method implementation performed by the serving network includes obtaining speed information indicative of the speed of one or more of the wireless devices in the wireless communication system and determining, based on the speed information, whether at least one of the one or more-wireless devices is moving at a speed at or above a speed threshold. The method further comprises configuring, if it is determined that at least one of the one or more- (Continued)

wireless devices is moving at a speed at or above the speed threshold, the at least one periodic operation with the shorter periodicity interval.

18 Claims, 16 Drawing Sheets

(51) Int. Cl.
| | |
|---|---|
| *H04W 24/10* | (2009.01) |
| *H04W 36/00* | (2009.01) |
| *H04W 4/02* | (2018.01) |
| *H04W 56/00* | (2009.01) |
| *H04W 76/28* | (2018.01) |
| *H04W 84/00* | (2009.01) |

(52) U.S. Cl.
CPC ....... *H04W 24/10* (2013.01); *H04W 36/0088* (2013.01); *H04W 56/001* (2013.01); *H04W 76/28* (2018.02); *H04W 84/005* (2013.01)

(56) References Cited

U.S. PATENT DOCUMENTS

| | | | |
|---|---|---|---|
| 2014/0003259 | A1 | 1/2014 | Chin et al. |
| 2014/0010131 | A1* | 1/2014 | Gaal ..................... H04L 5/0055 370/311 |
| 2015/0111563 | A1* | 4/2015 | Zhao ..................... H04W 24/08 455/418 |

FOREIGN PATENT DOCUMENTS

| | | |
|---|---|---|
| EP | 2798885 A1 | 11/2014 |
| EP | 2854438 A1 | 4/2015 |

OTHER PUBLICATIONS

3rd Generation Partnership Project; Technical Specification Group Radio Access Network; Study on performance enhancements for high speed scenario in LTE (Release 13); 3GPP TR 36.878 V13.0.0 (Jan. 2016), 92 pages.
3rd Generation Partnership Project; Technical Specification Group Radio Access Network; Evolved Universal Terrestrial Radio Access (E-UTRA); Requirements for support of radio resource management (Release 11); 3GPP TS 36.133 V11.16.0 (Mar. 2016), 817 pages.
3rd Generation Partnership Project; Technical Specification Group Radio Access Network; Evolved Universal Terrestrial Radio Access (E-UTRA); Radio Resource Control (RRC); Protocol specification (Release 11); 3GPP TS 36.331 V11.15.0 (Mar. 2016), 360 pages.
"Idle mode RRM for high speed scenarios," 3GPP TSG-RAN WG4 Meeting # 76, R4-154562, (XP051008130) Beijing, China, Aug. 24-28, 2015, Agenda Item 9.4.2, Ericsson, 3 pages.
"RRM issues in high speed scenarios," 3GPP TSG-RAN WG4 Meeting #76, R4-154763, Beijing, China, Aug. 24-28, 2015, Agenda Item 9.4.2, Huawei, HiSilicon, 7 pages.
"RRM issues analysis in UE connected state in DRX," 3GPP TSG-RAN WG4 Meeting #76bis, R4-155792, Sophia Antipolis, France, Oct. 12-16, 2015, Agenda Item 9.5.2, Huawei, HiSilicon, 8 pages.
"Discussion on high speed Rrm for connected mode," 3GPP TSG-RAN WG4 Meeting #76bis, R4-155854. Sophia Antipolis, France, Oct. 12-16, 2015, Agenda Item 9.5.2, Nokia Networks, 4 pages.
"Connected Mode RRM in High Speed Scenarios," 3GPP TSG-RAN WG4 Meeting #76 Bis, R4-156050, Sophia Antipolis, France, Oct. 12-16, 2015, Agenda Item 9.5.2, Qualcomm Incorporated, 1 page.
"Connected Mode RRM in High Speed Scenarios," 3GPP TSG-RAN WG4 Meeting #77, R4-157272, Anaheim, USA, Nov. 16-20, 2015, Agenda Item 9.5.2, Qualcomm Incorporated, 3 pages.
"TP for TR 36.878: Enhancement of RRM performance requirements for UE in DRX for high speed scenarios," 3GPP TSG-RAN WG4 Meeting #77, R4-158183, Anaheim, USA, Nov. 16-20, 2015, Agenda Item 9.5.2, Alcatel Lucent, 3 pages.
"Considerations on mobility in RRC Idle state for high speed train," 3GPP TSG-RAN WG4 Meeting # 78, R4-160533, (XP051056924) St. Julians's, Malta, Feb. 15-19, 2016, Agenda Item 8.12.2, Ericsson, 4 pages.
"New WI proposal: Performance enhancements for high speed scenario," 3GPP TSG RAN Meeting #70, RP-152263, Sitges, Spain, Dec. 7-10, 2015, Agenda Item XXX, NTT DOCOMO, Inc., Huawei, HiSilicon, 7 pages.
"RRM requirements for idle mode in high speed scenarios," 3GPP TSG-RAN WG4 Meeting #78bis, R4-161721, San Jose del Cabo, Mexico, Apr. 11-15, 2016, Agenda Item 7.12.2, 6 pages.
First Chinese Office Action for Chinese Patent Application No. CN 201780021429.0 dated Apr. 20, 2020, 15 pages (including English translation).

\* cited by examiner

| No. | Type of transmitted signal | Periodicity of signal (ms) | Applicability of UE speed (km/h) |
|---|---|---|---|
| 1 | DRS | 40 | ≥300 |
|  |  | 80 | <300 |
|  |  | 160 | <300 |
| 2 | PRS | 160 | ≥500 |
|  |  | 320 | 350 ≤ speed <500 |
|  |  | 640 | 300 ≤ speed <350 |
|  |  | 1280 | ≤300 |

FIG. 10

| No. | Type of transmitted signal | Periodicity of signal (ms) | Applicability of UE speed (km/h) | Measurement period of radio operation (ms) | |
|---|---|---|---|---|---|
| | | | | RSRP | RSTD |
| 1 | DRS | 40 | ≥300 | T0 | N/A |
| | | 80 | <300 | 2*T0 | N/A |
| | | 160 | <300 | 4*T0 | N/A |
| 2 | PRS | 160 | ≥500 | N/A | T1 |
| | | 320 | 350 ≤ speed <500 | N/A | 2*T1 |
| | | 640 | 300 ≤ speed <350 | N/A | 4*T1 |
| | | 1280 | ≤300 | N/A | 8*T1 |

FIG. 11

| No. | Type of transmitted signal | Applicability of UE speed (km/h) | Measurement period of radio operation (ms) | |
|---|---|---|---|---|
| | | | RSRP | RSTD |
| 1 | DRS | ≥300 | T0 | N/A |
| | | <300 | 2*T0 | N/A |
| | | <300 | 4*T0 | N/A |
| 2 | PRS | ≥500 | N/A | T1 |
| | | 350 ≤ speed <500 | N/A | 2*T1 |
| | | 300 ≤ speed <350 | N/A | 4*T1 |
| | | ≤300 | N/A | 8*T1 |

FIG. 12

TECHNIQUE FOR CONFIGURING A PERIODIC OPERATION IN A WIRELESS COMMUNICATION SYSTEM

CROSS REFERENCE TO RELATED APPLICATIONS

This application is a 35 U.S.C. § 371 national stage application of PCT International Application No. PCT/EP2017/057607 filed on Mar. 30, 2017, which in turns claims domestic priority to U.S. Provisional Patent Application No. 62/316,718, filed on Apr. 1, 2016, the disclosures and content of which are incorporated by reference herein in their entirety.

TECHNICAL FIELD

The present disclosure generally relates to communication systems. In particular, a technique for configuring a periodic operation in a wireless communication system is presented. The technique may be embodied in various aspects, such as apparatuses, wireless devices, systems, methods and computer programs.

BACKGROUND

The Third Generation Partnership Project, 3GPP, is investigating technical solutions to enhance mobility and demodulation performance in high speed environments that involve speeds of 350 km/h and beyond. Such high speed environments are presently realized in high speed trains such as the ICE in Germany, the Shinkansen in Japan or the Maglev in China.

Cells through which such high speed trains travel face particular challenges in that they potentially have to serve wireless devices on the trains and, at the same time, wireless devices of pedestrians. Configuring communication parameters of the cell and the wireless devices served by the cell with a focus on enhancing mobility and demodulation performance for the wireless devices moving at high speeds will obviously cause an unnecessary overhead from the perspective of any stationary or low speed devices (e.g., due to an unnecessarily increased power consumption of the latter devices). This situation is aggravated by the fact that high speed devices will be located in a particular cell only for a short period of time.

SUMMARY

There is a need for a technique that improves the performance of a wireless communication system in which wireless devices are moving at high speeds.

According to one aspect, a method of configuring at least one periodic operation in a wireless communication system comprising a plurality of wireless devices and a serving network serving the wireless devices is presented. The periodic operation is selectively configurable at one of a shorter periodicity interval and a longer periodicity interval. The method is performed by the serving network and comprises obtaining speed information indicative of the speed of one or more of the wireless devices in the wireless communication system and determining, based on the speed information, whether at least one of the one or more wireless devices is moving at a speed at or above a speed threshold. The method further comprises configuring, if it is determined that at least one of the one or more wireless devices is moving at a speed at or above the speed threshold, the at least one periodic operation with the shorter periodicity interval. The at least one periodic operation is preferably at least one of a periodic transmission of a downlink signal and a periodic transmission of an uplink signal.

According to a second aspect, another method of configuring at least one periodic operation in a wireless communication system comprising a plurality of wireless devices and a serving network serving the wireless devices is presented. The periodic operation is selectively configurable at one of a shorter periodicity interval and a longer periodicity interval. The method is performed by a wireless device and comprises obtaining speed information indicative of the speed of the wireless device and determining, based on the speed information, whether the wireless device is moving at a speed at or above a speed threshold. The method further comprises configuring, if it is determined that the wireless device is moving at a speed at or above the speed threshold, the at least one periodic operation with the shorter periodicity interval. The at least one periodic operation is preferably at least one of a periodic processing of a received downlink signal and a periodic transmission of an uplink signal.

According to a third aspect, a still further method of configuring at least one periodic operation in a wireless communication system comprising a plurality of wireless devices and a serving network serving the wireless devices is presented. The periodic operation is selectively configurable at one of a shorter periodicity interval and a longer periodicity interval. The method according to the third aspect is performed by a wireless device and comprises moving at a speed at or above a speed threshold, and receiving, responsive to moving at a speed at or above the speed threshold and from the serving network, information indicative of the at least one periodic operation being configured with the shorter periodicity interval. The method further comprises configuring, responsive to receipt of the information, the at least one periodic operation with the shorter periodicity interval. The at least one periodic operation is preferably at least one of a periodic processing of a received downlink signal and a periodic transmission of an uplink signal.

Also provided is a computer program product comprising program code portions to perform the steps of any of the methods and method aspects presented herein when the computer program product is executed on one or more processing devices. The computer program product may be stored on one or more computer-readable recording media, such as semiconductor memories, CD-ROMS, DVDs, and so on. The computer program product may in one example be distributed among various components of a virtualized base station. In another example, the computer program product may reside in a wireless device.

A computer program is also provided that comprises program code portions for performing the steps of any of the method embodiments when the computer program is executed on one or more processing devices.

According to a fourth aspect, a network apparatus is provided that is adapted to configure at least one periodic operation in a wireless communication system comprising a plurality of wireless devices and a serving network serving the wireless devices. The periodic operation is selectively configurable at one of a shorter periodicity interval and a longer periodicity interval, and the network apparatus is adapted to obtain speed information indicative of the speed of one or more of the wireless devices in the wireless communication system and to determine, based on the speed information, whether at least one of the one or more wireless devices is moving at a speed at or above a speed threshold. The network apparatus is further adapted to configure, if it is determined that at least one of the one or more wireless devices is moving at a speed at or above the speed threshold, the at least one periodic operation with the shorter periodicity interval. The at least one periodic operation is preferably at least one of a periodic transmission of a downlink signal and a periodic transmission of an uplink signal.

The network apparatus may further be adapted to perform any of the steps of the method according to the first aspect, or other steps.

According to a fifth aspect, a wireless device is provided that is adapted to configure at least one periodic operation in a wireless communication system comprising a plurality of wireless devices and a serving network serving the wireless devices. The periodic operation is selectively configurable at one of a shorter periodicity interval and a longer periodicity interval, and the wireless device is adapted to obtain speed information indicative of the speed of the wireless device and to determine, based on the speed information, whether the wireless device is moving at a speed at or above a speed threshold. Still further, the wireless device is adapted to configure, if it is determined that the wireless device is moving at a speed at or above the speed threshold, the at least one periodic operation with the shorter periodicity interval. The at least one periodic operation is preferably at least one of a periodic processing of a received downlink signal and a periodic transmission of an uplink signal.

The wireless device may further be adapted to perform the steps of the method according to the second aspect, or other steps.

According to a sixth aspect, a wireless device is provided that is adapted to configure at least one periodic operation in a wireless communication system comprising a plurality of wireless devices and a serving network serving the wireless devices. The periodic operation is selectively configurable at one of a shorter periodicity interval and a longer periodicity interval, and the wireless device is adapted to move at a speed at or above a speed threshold and to receive, responsive to moving at a speed at or above the speed threshold and from the serving network, information indicative of the at least one periodic operation being configured with the shorter periodicity interval. The wireless device is further adapted to configure, responsive to receipt of the information, the at least one periodic operation with the shorter periodicity interval. The at least one periodic operation is preferably at least one of a periodic processing of a received downlink signal and a periodic transmission of an uplink signal.

The wireless device may further be adapted to perform the steps of the method according to the third aspect, or other steps.

In the above aspects, the at least one periodic operation could additionally, or alternatively, comprise a periodic processing of an uplink signal (in particular on the side of the serving network or a network node of a neighbouring network). The serving network or the neighbouring network node may configure the wireless device to properly perform the periodic transmission of the uplink signal.

Also provided is a network system comprising the network apparatus according to the fourth aspect and at least one wireless device according to the fifths aspect and/or the fourth aspect.

BRIEF DESCRIPTION OF THE DRAWINGS

Further details of embodiments of the technique are described with reference to the enclosed drawings, wherein:

FIG. 10 shows a schematic diagram indicative of a relationship between signal periodicities and device speeds for two exemplary periodic operations;

FIG. 11 shows a schematic diagram indicative of a relationship between signal periodicities, measurement periods and device speeds for two exemplary periodic operations and two exemplary measurements;

FIG. 12 shows a schematic diagram indicative of a relationship between measurement periods and device speeds for two exemplary periodic operations and two exemplary measurements.

DETAILED DESCRIPTION

Figure 1:
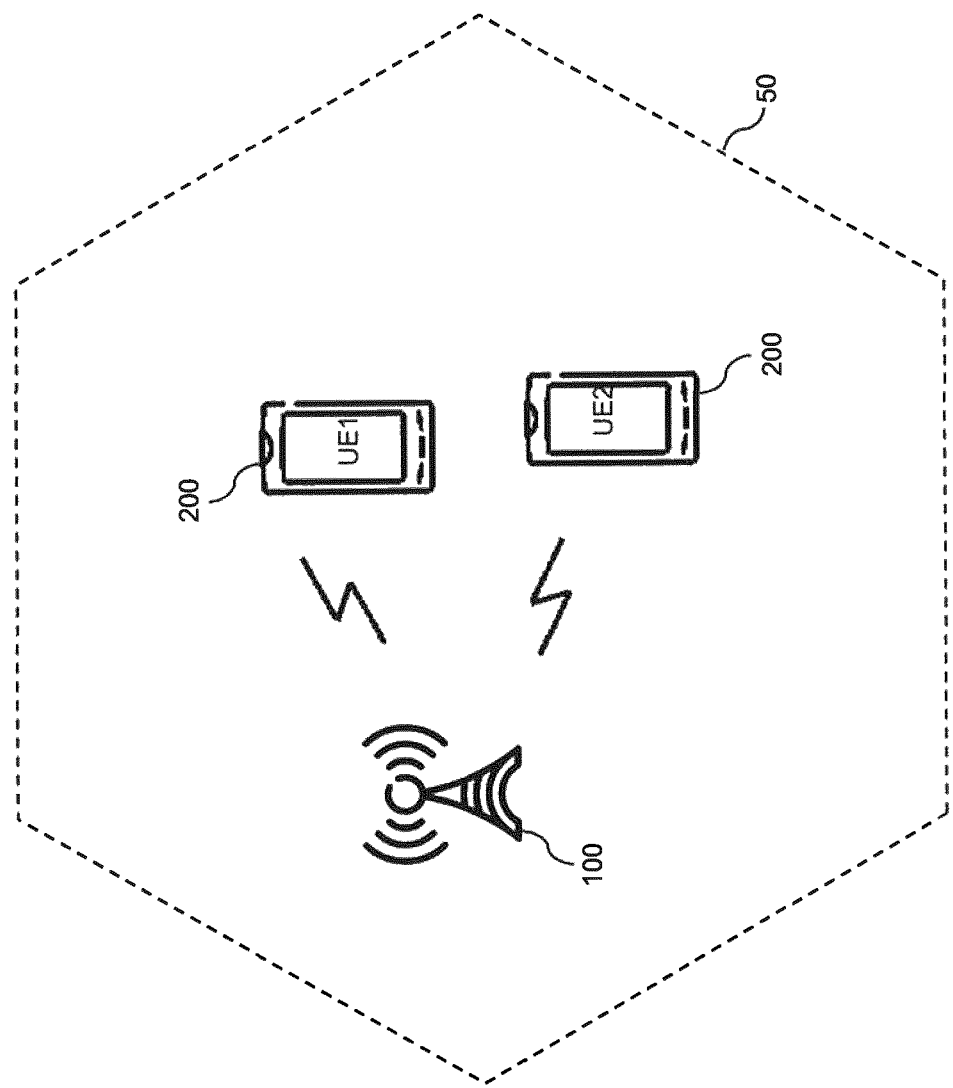
FIG. 1 shows a schematic diagram of a communication system embodiment.

In the following description, for purposes of explanation and not limitation, specific details are set forth, such as specific wireless communication systems and network environments, in order to provide a thorough understanding of the technique disclosed herein. It will be apparent to one skilled in the art that the technique may be practiced in other embodiments that depart from these specific details. Any two or more embodiments described herein can be combined in any way with each other.

According to a first embodiment, a method of configuring at least one periodic operation in a wireless communication system comprising a plurality of wireless devices and a serving network serving the wireless devices is presented. The periodic operation is selectively configurable at one of a shorter periodicity interval and a longer periodicity interval. The method is performed by the serving network and comprises obtaining speed information indicative of the speed of one or more of the wireless devices in the wireless communication system and determining, based on the speed information, whether at least one of the one or more wireless devices is moving at a speed at or above a speed threshold. The method further comprises configuring, if it is determined that at least one of the one or more wireless devices is moving at a speed at or above the speed threshold, the at least one periodic operation with the shorter periodicity interval. The at least one periodic operation is preferably, but not necessarily, at least one of a periodic transmission of a downlink signal and a periodic transmission of an uplink signal.

The method may, for example, be performed by one or more network nodes serving the wireless devices. Each network node may be realized as a stand-alone component or by cloud computing resources. The network node may take the form of a base station or similar access or radio network entity.

The serving network may comprise one or more network nodes serving the at least one wireless device.

The periodic operation may be currently applied in the wireless communication system or may be to be applied in the wireless communication system.

The periodicity interval may denote a time length or a cycle length at which the periodic operation may be periodically (e.g., repeatedly) performed respectively applied.

The configuration step may be implemented locally on the network side (e.g., a periodic operation performed by a network node may be configured, such as a downlink signal transmission). Additionally, or in the alternative, the configuration step may be implemented on the side of the one or more wireless devices (e.g., a periodic operation performed by the one or more wireless devices may be configured, such as an uplink signal transmission and/or a measurement-related operation). In the latter case, the configuring step may comprise transmitting information indicative of the shorter periodicity interval to the one or more wireless devices.

The configuration step may be performed to only affect a dedicated wireless device that has been found to move with a speed at or above the speed threshold. In another variant, the configuration step is performed to affect a set of two or more wireless devices if at least one wireless device from the set is found to move with a speed at or above the speed threshold. The set of wireless devices may be constituted by the wireless devices served by a particular serving network.

The speed threshold may exceed 200 km/h, and in particular 300 km/h. In certain variants the speed threshold is set to 350 km/h or beyond.

The periodicity interval may be set to assume continuous values or discrete values. In both cases, it may at least be set to a first value corresponding to a longer interval duration and a second value corresponding to a shorter interval duration. Of course, the periodicity interval may be set to a plurality of further (third, fourth, etc.) values as needed.

The longer periodicity interval may be an integer multiple of the shorter periodicity interval. For example, the longer periodicity interval may be set to two to six times the shorter periodicity interval.

The periodicity intervals may be synchronized among some or all of the wireless devices. The synchronization may be such that intervals applied by different wireless devices can (but need not) start at the same point in time.

Different wireless devices served by the serving network may apply different periodicity intervals. If some wireless devices apply, for example, a shorter periodicity interval having a first duration and other wireless devices apply a longer periodicity interval having twice the first duration, the synchronization may guarantee that the longer periodicity interval always starts with the shorter periodicity interval.

The method may further comprise configuring, if it is determined that the at least one wireless device is, or all wireless devices are (e.g., from a set of wireless devices served by a network node), moving at a speed below the speed threshold, the periodic operation with the longer periodicity interval. It will be appreciated that for one or more first wireless devices the longer periodicity interval may apply while at the same time the shorter periodicity interval may apply for one or more second wireless devices. The first and second wireless devices may belong to a set of wireless devices served by a network node.

In one variant, obtaining the speed information for the one or more wireless devices comprises receiving the speed information from the one or more wireless devices. In another variant, obtaining the speed information for the one or more wireless devices comprises performing a measurement of a speed-related parameter for each of the one or more wireless devices (e.g., by analysing an associated Doppler frequency shift).

The method may also comprise triggering transmission of information indicative of the configured periodicity interval to the at least one wireless device. The configured periodicity interval may be indicated as such or in a coded form.

The at least one periodic operation may be a periodic transmission of a downlink signal by the serving network and/or a network node in a neighbouring cell (e.g., a cell adjacent to a cell operated by the serving network). The method may in such a scenario further comprise triggering a periodic transmission of the downlink signal with the configured periodicity interval. The downlink signal may be selected from the following signals: a discovery signal, a reference signal, a synchronization signal, a system information signal.

In the above or any other scenario, the method may also comprise obtaining further information indicative of at least one of a speed information update and of wireless devices being no longer served. Based on the further information, it may be determined that there is currently no longer any wireless device that is moving at a speed at or above the speed threshold, and the periodic operation may be re-configured with the longer periodicity interval.

The at least one periodic operation may be a periodic transmission of an uplink signal by the at least one wireless device. The uplink signal may be selected from the following signals: a reference signal, a report signal. The report signal may be or comprise the Channel Quality Indicator (CQI). The CQI may be transmitted as the report signal or in the report signal by the wireless device. Alternatively, or in addition, the report signal may be related to (e.g., comprise) a Channel State Information, CSI, report. Examples of CSI reports pertain to a Rank Indicator (RI), a Precoding Matrix Indicator (PMI), a CSI Resource Indicator (CRI), the CQI, and so on.

The at least one periodic operation may be related to a measurement performed by the at least one wireless device. For example, the periodic operation may be the measurement itself that will be performed in the configured periodicity interval. However, the periodic operation could also more relate to another aspect of the measurement, such as the reporting of measurements.

The method may further comprise obtaining further information indicative of a speed information update and determining, based on the further information, that at least one of the one or more wireless devices that has been moving at a speed at or above a speed threshold is no longer moving at a speed at or above the speed threshold. In this case the periodic operation may be configured with the longer periodicity interval for the at least one wireless device that is no longer moving at a speed at or above the speed threshold.

The method may further comprise determining an activity state of the at least one wireless device moving at a speed at or above the speed threshold, and selecting the periodic operation that is to be configured dependent on the activity state. The activity state may take one of two or more predefined states. As an example, the activity state could be one of an idle state and an active state of the at least one wireless device.

The method may further comprise triggering transmission of information indicative of the speed threshold to the wireless devices. As an example, the speed threshold may be indicated as such (e.g., in the form of a specific threshold value, possibly in a coded manner) or in the form of any functional or other relationship (e.g., the speed threshold may depend on the activity state of the wireless device).

The method may further comprise triggering transmission of information indicative of a relationship between periodicity intervals and device speeds for the at least one periodic operation to the wireless devices. The relationship may be a functional relationship or a mapping.

The method may further comprise triggering transmission of information indicative of a speed of a particular wireless device to the wireless device. As such, the network side may measure the device speed (directly or indirectly) and transmit a corresponding indication to the wireless device. Based on the received indication, the wireless device may autonomously perform any of the method aspects discussed below, or other processes.

According to a second embodiment, another method of configuring at least one periodic operation in a wireless communication system comprising a plurality of wireless devices and a serving network serving the wireless devices is presented. The periodic operation is selectively configurable at one of a shorter periodicity interval and a longer periodicity interval. The method is performed by a wireless device and comprises obtaining speed information indicative of the speed of the wireless device and determining, based on the speed information, whether the wireless device is moving at a speed at or above a speed threshold. The method further comprises configuring, if it is determined that the wireless device is moving at a speed at or above the speed threshold, the at least one periodic operation with the shorter periodicity interval. The at least one periodic operation is preferably, but not necessarily, at least one of a periodic processing of a received downlink signal and a periodic transmission of an uplink signal.

The periodic operation may be currently applied in the wireless communication system or may be to be applied in the wireless communication system.

The periodicity interval may denote a time length or a cycle length at which the periodic operation may be periodically (e.g., repeatedly) performed respectively applied.

The configuring step may be performed autonomously by the wireless device in response to moving at a speed at or above the speed threshold. Alternatively, the configuring step may be performed under control of the serving network. As an example, the wireless device may send a first indication to the serving network that the wireless device has determined that it is moving at a speed at or above the speed threshold. Responsive to that first indication, the wireless device may receive from the network side a second indication that the at least one periodic operation needs to be configured with the shorter periodicity interval. Responsive to receipt of that second indication, the configuring step may be performed. It will be appreciated that in this scenario the configuring step will still be performed responsive to the determination that it is moving at or above the speed threshold.

As explained above, the longer periodicity interval may be an integer multiple of the shorter periodicity interval. The method may further comprise configuring, if it is determined that the wireless device is moving at a speed below the speed threshold, the periodic operation with the longer periodicity interval.

Obtaining the speed information may comprise receiving the speed information from the serving network. Alternatively, obtaining the speed information may comprise performing a measurement of a speed-related parameter. The method may further comprise transmitting the speed information to the serving network.

The method may also comprise transmitting information indicative of the configured periodicity interval to the serving network. The configured periodicity interval may in particular be indicated in case the wireless device configures it fully or at least partially autonomously.

The at least one periodic operation may be a periodic processing of a downlink signal received from the serving network and/or a network node in a neighbouring cell (e.g., a cell adjacent to a cell operated by the serving network). Alternatively or in addition, the at least one periodic operation may a periodic transmission of an uplink signal by the wireless device. The uplink signal may be selected from the following signals: a reference signal, a report signal. Alternatively or in addition, the at least one periodic operation may be related to a measurement performed by the wireless device.

The method according to the second embodiment may further comprise obtaining updated speed information and determining, based on the updated speed information, that the wireless device that has been moving at a speed at or above a speed threshold is no longer moving at a speed at or above the speed threshold. The periodic operation may be re-configured in this case with the longer periodicity interval.

The method according to the second embodiment may further comprise determining an activity state of the wireless device as explained above, and selecting the periodic operation that is to be configured dependent on the activity state. The method may also comprise receiving information indicative of the speed may comprise receiving information indicative of a relationship between periodicity intervals and device speeds for the at least one periodic operation from the serving network.

According to a third embodiment, a still further method of configuring at least one periodic operation in a wireless communication system comprising a plurality of wireless devices and a serving network serving the wireless devices is presented. The periodic operation is selectively configurable at one of a shorter periodicity interval and a longer periodicity interval. The method according to the third embodiment is performed by a wireless device and comprises moving at a speed at or above a speed threshold, and receiving, responsive to moving at a speed at or above the speed threshold and from the serving network, information indicative of the at least one periodic operation being configured with the shorter periodicity interval. The method further comprises configuring, responsive to receipt of the information, the at least one periodic operation with the shorter periodicity interval. The at least one periodic operation is preferably, but unnecessarily, at least one of a periodic processing of a received downlink signal and a periodic transmission of an uplink signal.

The periodic operation may be currently applied in the wireless communication system or may be to be applied in the wireless communication system.

The periodicity interval may denote a time length or a cycle length at which the periodic operation may be periodically (e.g., repeatedly) performed respectively applied.

The longer periodicity interval may be an integer multiple of the shorter periodicity interval.

The method according to the third embodiment may further comprise decelerating to move at a speed below the speed threshold and receiving, responsive to moving at a speed below the speed threshold and from the serving network, further information indicative of the at least one periodic operation being configured with the longer periodicity interval. Moreover, the method may comprise configuring, responsive to receipt of the further information, the at least one periodic operation with the longer periodicity interval.

The method according to the third embodiment may also comprise determining speed information indicative of the speed of the wireless device, and transmitting the speed information to the serving network.

As said, the at least one periodic operation may be a periodic processing of a downlink signal received from the serving network and/or a network node in a neighbouring cell (e.g., a cell adjacent to a cell operated by the serving network). Alternatively, or in addition, the at least one periodic operation may be a periodic transmission of an uplink signal by the wireless device. The uplink signal may be selected from the following signals: a reference signal, a report signal. Alternatively, or in addition, the at least one periodic operation may be related to a measurement performed by the wireless device.

Also provided is a computer program product comprising program code portions to perform the steps of any of the methods and method aspects presented herein when the computer program product is executed on one or more processing devices. The computer program product may be stored on one or more computer-readable recording media, such as semiconductor memories, CD-ROMS, DVDs, and so on. The computer program product may in one example be distributed among various components of a virtualized base station. In another example, the computer program product may reside in a wireless device.

A computer program is also provided that comprises program code portions for performing the steps of any of the method embodiments when the computer program is executed on one or more processing devices.

According to a fourth embodiment, a network apparatus is provided that is adapted to configure at least one periodic operation in a wireless communication system comprising a plurality of wireless devices and a serving network serving the wireless devices. The periodic operation is selectively configurable at one of a shorter periodicity interval and a longer periodicity interval, and the network apparatus is adapted to obtain speed information indicative of the speed of one or more of the wireless devices in the wireless communication system and to determine, based on the speed information, whether at least one of the one or more wireless devices is moving at a speed at or above a speed threshold. The network apparatus is further adapted to configure, if it is determined that at least one of the one or more wireless devices is moving at a speed at or above the speed threshold, the at least one periodic operation with the shorter periodicity interval. The at least one periodic operation is preferably, but not necessarily, at least one of a periodic transmission of a downlink signal and a periodic transmission of an uplink signal.

The network apparatus may further be adapted to perform any of the steps of the method according to the first aspect, or other steps.

According to a fifth aspect, a wireless device is provided that is adapted to configure at least one periodic operation in a wireless communication system comprising a plurality of wireless devices and a serving network serving the wireless devices. The periodic operation is selectively configurable at one of a shorter periodicity interval and a longer periodicity interval, and the wireless device is adapted to obtain speed information indicative of the speed of the wireless device and to determine, based on the speed information, whether the wireless device is moving at a speed at or above a speed threshold. Still further, the wireless device is adapted to configure, if it is determined that the wireless device is moving at a speed at or above the speed threshold, the at least one periodic operation with the shorter periodicity interval. The at least one periodic operation is preferably, but not necessarily, at least one of a periodic processing of a received downlink signal and a periodic transmission of an uplink signal.

The wireless device may further be adapted to perform the steps of the method according to the second embodiment, or other steps.

According to a sixth embodiment, a wireless device is provided that is adapted to configure at least one periodic operation in a wireless communication system comprising a plurality of wireless devices and a serving network serving the wireless devices. The periodic operation is selectively configurable at one of a shorter periodicity interval and a longer periodicity interval, and the wireless device is adapted to move at a speed at or above a speed threshold and to receive, responsive to moving at a speed at or above the speed threshold and from the serving network, information indicative of the at least one periodic operation being configured with the shorter periodicity interval. The wireless device is further adapted to configure, responsive to receipt of the information, the at least one periodic operation with the shorter periodicity interval. The at least one periodic operation is preferably, but not necessarily, at least one of a periodic processing of a received downlink signal and a periodic transmission of an uplink signal.

The wireless device may further be adapted to perform the steps of the method according to the third embodiment, or other steps.

Also provided is a network system comprising the network apparatus according to the fourth aspect and at least one wireless device according to the fifths aspect and/or the fourth aspect.

While the following embodiments are primarily described for cellular (e.g., LTE and 5G) implementations, it is readily apparent that the technique described herein may also be implemented in any other wireless communication network, including a Wireless Local Area Network (WLAN) according to the standard family IEEE 802.11 (e.g., IEEE 802.11a, g, n or ac; also referred to as Wi-Fi) and/or a Worldwide Interoperability for Microwave Access (WiMAX) according to the standard family IEEE 802.16. Furthermore, even though some embodiments are given in the Licensed Assisted Access (LAA) context, the embodiments described herein are not limited to LAA. The described embodiments are not limited to LTE or 5G either, but can be adapted to other Radio Access Technologies (RATs) including UMTS Terrestrial Radio Access (UTRA), LTE-Advanced, 5G, NX, NB-IoT, WiFi, and BlueTooth.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the present disclosure may also be embodied in a computer program product as well as in a system comprising a computer processor and memory coupled to the processor, wherein the memory is encoded with one or more programs that may perform the services, functions, steps and implement the units disclosed when executed on the processor herein.

In some embodiments, the non-limiting term User Equipment (UE) is used to denote a wireless device. The UE can be any type of wireless device capable of communicating with a network node or another UE over radio signals. The UE may also be any radio communication device, target device, device-to-device (D2D) UE, machine-type UE or UE capable of machine-to-machine communication (M2M), a sensor equipped with UE, a tablet, smart phone, laptop-embedded equipment (LEE), laptop-mounted equipment (LME), USB dongles, Customer Premises Equipment (CPE), and so on.

Also in some embodiments, the generic terminology "network node" is used. This terminology denotes any kind of network node which may comprise a radio or access network node such as a base station, radio base station, base transceiver station, base station controller, network controller, evolved Node B (eNodeB or eNB), Node B, Multi-cell/multicast Coordination Entity (MCE), relay node, access point, radio access point, Remote Radio Unit (RRU), Remote Radio Head (RRH). It may also comprise a core network node (e.g., Mobility Management Entity or MME, Self-Organizing Network (SON) node, a coordinating node, positioning node, Maintenance and Drive Test (MDT) node, etc.), or an external node. A network node may comprise one or more sub-units, such as one or more apparatuses. The apparatuses may include a network apparatus in charge of processing operations and a transceiver in charge of transmitting/receiving operations (e.g., in the RF frequency band).

The embodiments are applicable to single carrier as well as to multicarrier or Carrier Aggregation (CA) operation of the wireless device in which the wireless device is able to receive and/or transmit data to more than one serving cells. CA is also called (e.g., interchangeably) "multi-carrier system", "multi-cell operation", "multi-carrier operation", "multi-carrier" transmission and/or reception. In CA, one of the Component Carriers (CCs) is the Primary Component Carrier (PCC) or simply primary carrier or anchor carrier. The remaining ones are called Secondary Component Carriers (SCCs) or simply secondary carriers or supplementary carriers. The serving cell is interchangeably called Primary Cell (PCell) or Primary Serving Cell (PSC). Similarly, the secondary serving cell is interchangeably called Secondary Cell (SCell) or Secondary Serving Cell (SSC).

The term "high speed" as used herein may refer to certain speed of the wireless device (e.g., to a speed of at least 200 km/h, 300 km/h or 350 km/h). In another example, the term may refer to any speed which is above a speed threshold associated with a fast moving wireless device. Any speed threshold as described herein may (e.g., also) depend on the frequency band used by the wireless device. The speed threshold may also be expressed in terms of a Doppler frequency (or frequency shift) of the frequency band used by the UE. An example of the speed threshold in terms of a Doppler frequency shift is 600 Hz. In yet another example the speed threshold can be expressed in terms of two or more speed levels corresponding to different ranges of speeds: low speed, medium speed and high speed.

The term "signal transmission" as partially used herein may refer to certain types of periodic signals that are transmitted by the network in downlink or by the wireless device in the uplink. The signal transmission may comprise transmission of a physical signal or a physical channel or both. In one variant, the physical signal does not carry higher layer information, whereas the physical channel carries higher layer information. Examples of physical signals include a Reference Signal (RS), positioning RS, synchronization signal, Demodulation Reference Signal (DMRS), Sounding Reference Signal (SRS), Cell Specific Reference Signal (CS-RS) etc. Examples of physical channels include a Physical Downlink Control Channel (PDCCH), Physical Uplink Shared Channel (PDSCH), Physical Uplink Control Channel (PUSCH), Physical Uplink Control Channel (PUCCH), Physical Random Access Channel (PRACH) etc. These and other signals and/or channels are used by the network and/or by the wireless device for performing one or more operations. Examples of operations are radio measurements, channel estimation, synchronization, and so on. Examples of wireless device measurements are cell identification, radio link monitoring, out-of-sync evaluation, in-sync evaluation, Channel Quality Indicator (CQI), signal strength, signal quality, Observed Time Difference Of Arrival (OTDOA), Reference Signal Time Difference Measurement (RSTD), Reference Signal Received Power (RSRP), Reference Signal Received Quality (RSRQ), Signal-to-Noise Ratio (SNR), Signal-to-Interference-plus Noise Ration (SINR), Reference Signal (RS-) SINR, Block Error Rate (BLER), path loss, timing advance, UE Rx-Tx time difference measurement, eNB Rx-Tx time difference measurement, and so on.

FIG. 1 illustrates an embodiment of a wireless communication system comprising a network node 100 (e.g., a node of an access or radio network, such as a base station) as well as multiple wireless devices 200 served by the network node 100 (e.g., mobile telephones, smartphones, tablet computers, and so on). As explained above, the wireless devices 200 are sometimes also denoted User Equipments (UEs). The network node 100 provides one or more cells 50 in which the wireless devices 200 served by the network node 100 are located. The network node 100 and the wireless devices 200 may be compliant with the LTE specifications or 5G concepts. In the LTE vocabulary, the network node 100 is also denoted eNodeB.

It will be appreciated that the communication system embodiment illustrated in FIG. 1 will comprise additional components not illustrated therein. Such additional components include, for example, core network components, Internet servers, and so on.

Figure 2:
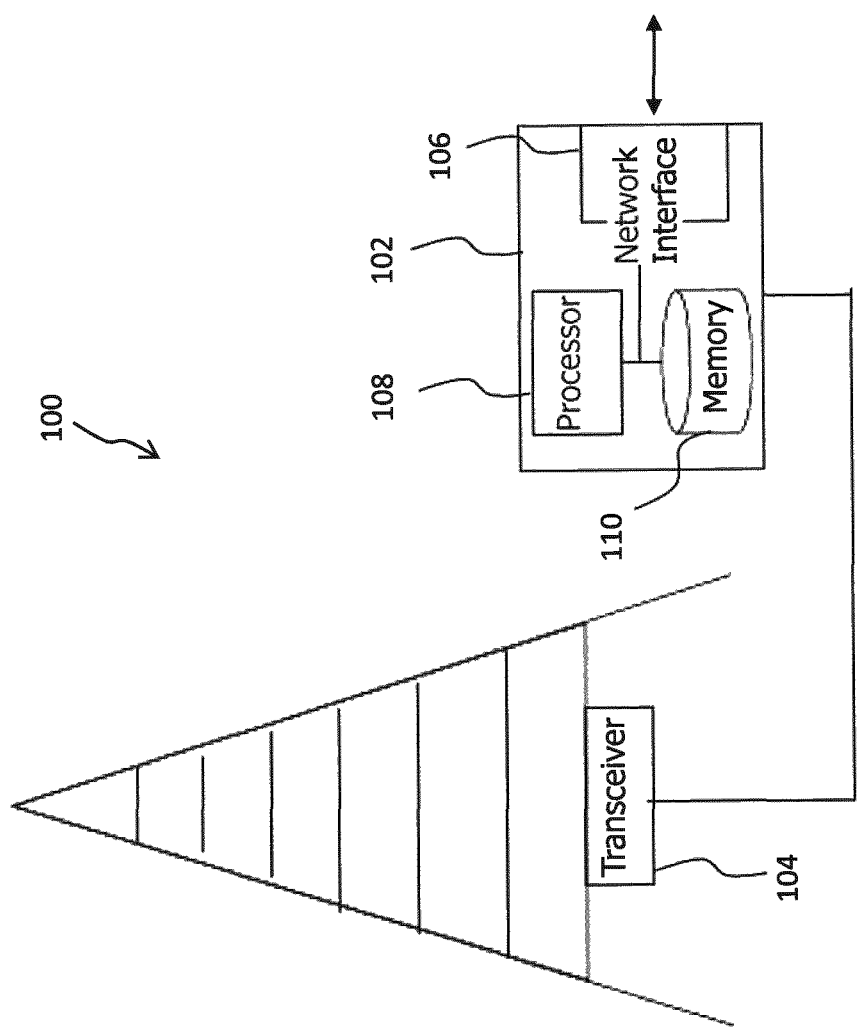
FIG. 2 shows a schematic block diagram of a network apparatus embodiment.

FIG. 2 illustrates a block diagram of an embodiment of the network node 100. As illustrated in FIG. 2, the network node 100 comprises a network apparatus 102 and a transceiver 104 coupled to the network apparatus 102. The network apparatus 102 in the present embodiment comprises a network interface 106 (e.g., towards a core network and/or backhaul network), at least one processor 108 as well as at least one memory 110. The memory 110 is configured to store program code that, when executed by the at least one processor 108, controls the network node 100 to perform the steps, functions and services discussed herein. It will be appreciated that the network node 100 could also be realized in a distributed manner using cloud computing resources. In such a case the network apparatus 102 will be a virtualized network entity.

Figure 3:
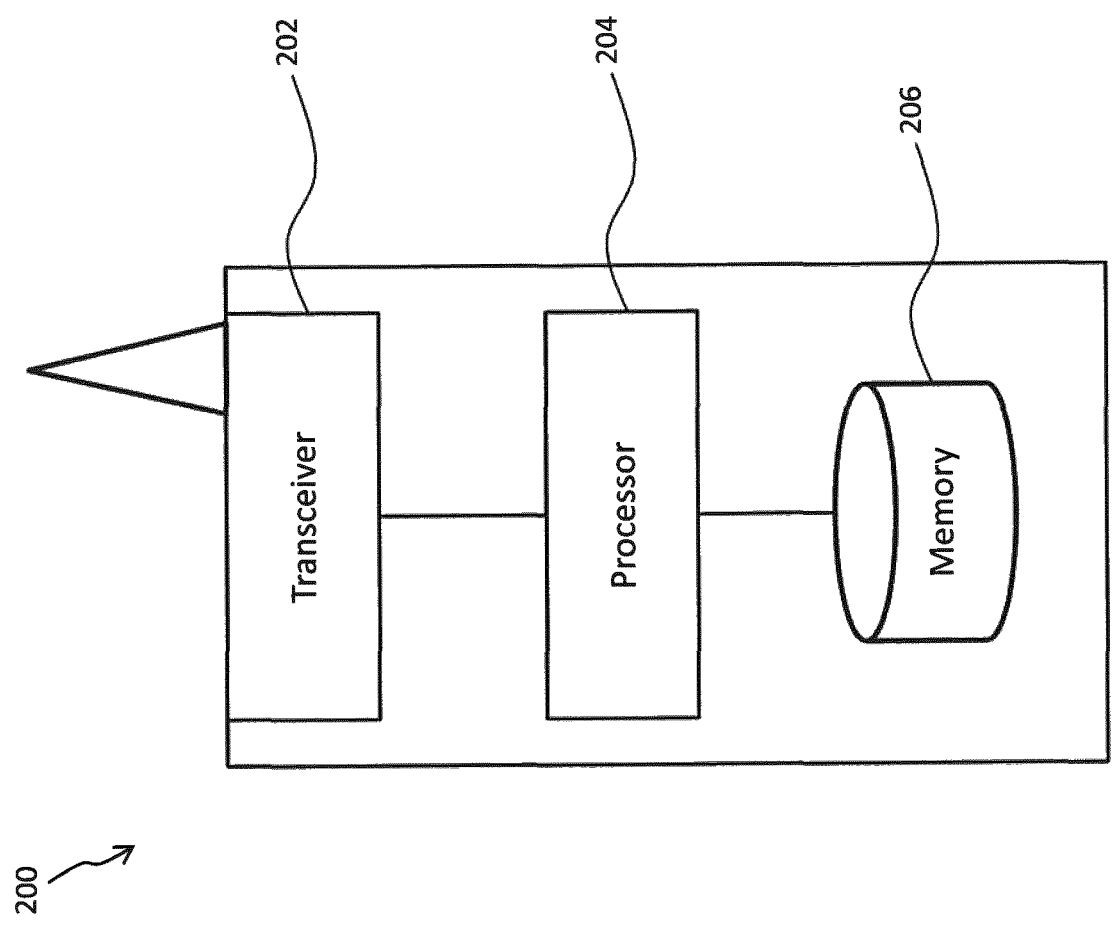
FIG. 3 shows a schematic block diagram of a wireless device embodiment.

FIG. 3 illustrates an embodiment of a wireless device 200. The wireless device 200 illustrated in FIG. 3 comprises a transceiver 202, at least one processor 204 and at least one memory 206. The memory 206 is configured to store program code that, when executed by the at least one processor 204, controls the wireless device 200 to perform the functions and steps presented herein.

In the following, functional embodiments of the network node 100 and the wireless device 200 will be explained in greater detail with reference to FIG. 4 and FIGS. 5 and 6 respectively. These functional embodiments may be implemented in the context of the structural embodiments of the network node 100 and the wireless device 200 as illustrated in FIGS. 2 and 3, respectively, or in embodiments having other structural features.

The functional embodiments target at configuring at least one periodic operation in the wireless communication system of FIG. 1. The periodic operation is selectively configurable at one of a shorter periodicity interval and a longer periodicity interval. The periodic operation is configured to assume two or more periodicity interval values from a continuous value range or from a set of discrete values.

The at least one periodic operation may be a periodic transmission and/or processing of a downlink signal (sent by the network node 100 and/or sent by a neighbouring network node communicatively connected to the serving network for receiving therefrom the information necessary to perform the periodic transmission and/or processing of the downlink signal). Associated downlink parameter settings may be configured for the whole cell served by the network node 100. Alternatively or in addition, the at least one periodic operation may a periodic transmission and/or processing of an uplink signal (sent by the wireless device 200). Alternatively or in addition, the at least one periodic operation may be related to a measurement or other operation (e.g., in a CSI context) performed by the wireless device 200.

Examples of periodic operations in the form of downlink signal transmissions include:
  discovery signal transmissions (e.g., configuration of dmtc-Periodicity)
  Positioning Reference Signal (PRS) transmissions
  CSI reference signal transmissions
  Demodulation (DM) reference signal transmissions
  Multicast-Broadcast Single-Frequency Network (MB-SFN) reference signal transmissions
  Synchronization signal transmissions
  System signal transmissions, such as Master Information Block (MIB) transmissions or System Information Block (SIBx) transmissions (e.g., configuration of si-Perdiocity)

Examples of periodic operations in the form of uplink signal transmissions include:
  Sounding Reference Signal (SRS) transmissions
  Report transmission, such as CSI report transmissions (e.g., in regard to one or more of RI, PMI and CRI) and CQI report transmissions Examples of periodic operations related to measurements or other operations performed by wireless devices 200 include:
  CQI reporting period
  measCycleSCell
  rmtc-Period
  MDT LoggingInterval
  Measurement gap periodicity
  reportInterval
  Switching rate in accordance with 3GPP RP-160676 "SRS Carrier based Switching for LTE". The switching rate defines the rate at which the SRS is transmitted on a carrier which is not configured with transmission of an uplink physical channel (e.g., PUCCH, PUSCH, etc).

Figure 4:
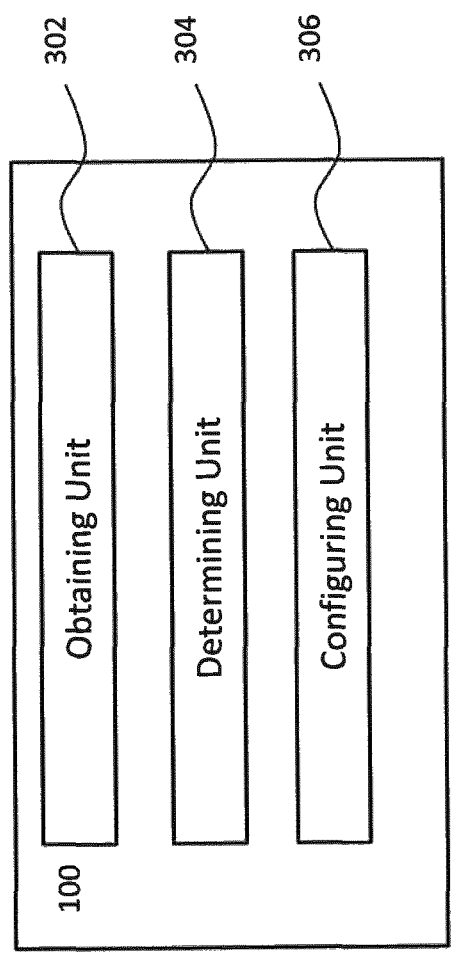
FIG. 4 is a schematic block diagram of a further network apparatus embodiment.

As illustrated in FIG. 4, the network node 100 in one functional embodiment comprises an obtaining unit 302 adapted to obtain speed information indicative of the speed of one or more of the wireless devices 200 in the wireless communication system of, for example, FIG. 1. A determining unit 304 is adapted to determine, based on the speed information, whether at least one of the one or more wireless devices 200 is moving at a speed at or above a speed threshold. Moreover, a configuring unit 306 is adapted to configure, if it is determined that at least one of the one or more wireless devices 200 is moving at a speed at or above the speed threshold, the at least one periodic operation with the shorter periodicity interval.

The individual units 302 to 306 may take the form of software modules stored in the memory 110 of the network node 100. Alternatively, the units 302 to 306 could also (e.g., at least partially) be realized as hardware components.

Figure 5:
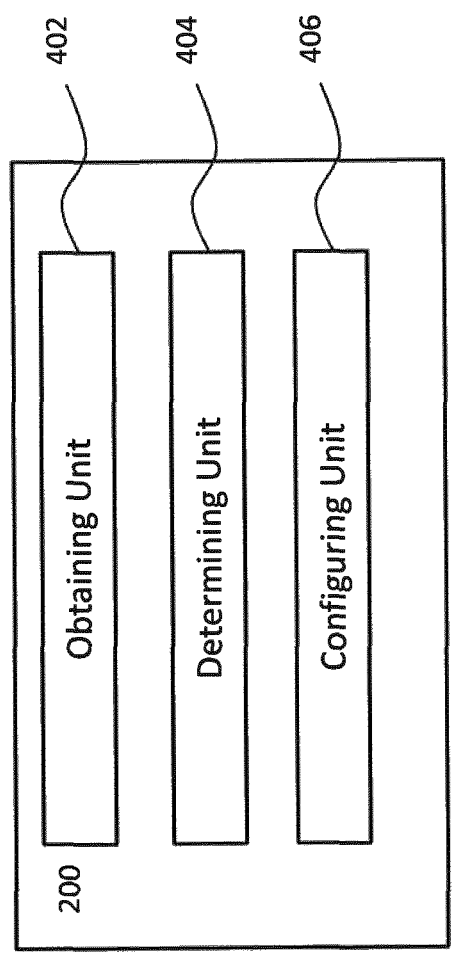
FIG. 5 is a schematic block diagram of a further wireless device embodiment.

As illustrated in FIG. 5, the wireless device 200 in one functional embodiment comprises an obtaining unit 402 adapted to obtaining speed information indicative of the speed of the wireless device 200. A determining unit 404 is adapted determine, based on the speed information, whether the wireless device 200 is moving at a speed at or above a speed threshold. Moreover, a configuring unit 406 is adapted to configure, if it is determined that the wireless device 200 is moving at a speed at or above the speed threshold, the at least one periodic operation with the shorter periodicity interval.

The individual units 402 to 406 may take the form of software modules stored in the memory 110 of the wireless device 200. Alternatively, the units 402 to 406 could also (e.g., at least partially) be realized as hardware components.

Figure 6:
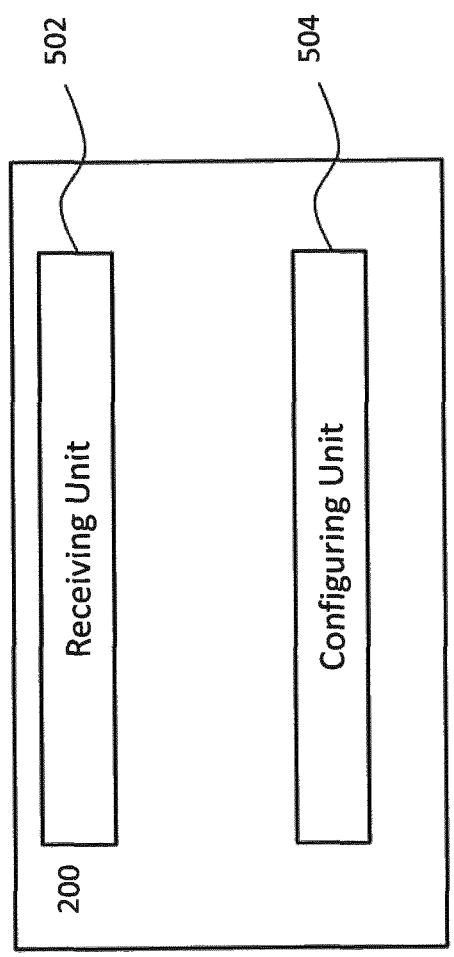
FIG. 6 is a schematic block diagram of a still further wireless device embodiment.

As illustrated in FIG. 6, the wireless device 200 in another functional embodiment (that may be combined with the functional embodiment of FIG. 5) comprises a receiving unit 502 adapted to receive, responsive to moving at a speed at or above a speed threshold and from the network (e.g., the network node 100), information indicative of the at least one periodic operation being configured with the shorter periodicity interval. Moreover, a configuring unit 504 is adapted to configure, responsive to receipt of the information, the at least one periodic operation with the shorter periodicity interval.

The individual units 502 and 504 may take the form of software modules stored in the memory 110 of the wireless device 200. Alternatively, the units 502 and 504 could also (e.g., at least partially) be realized as hardware components.

Figure 7:
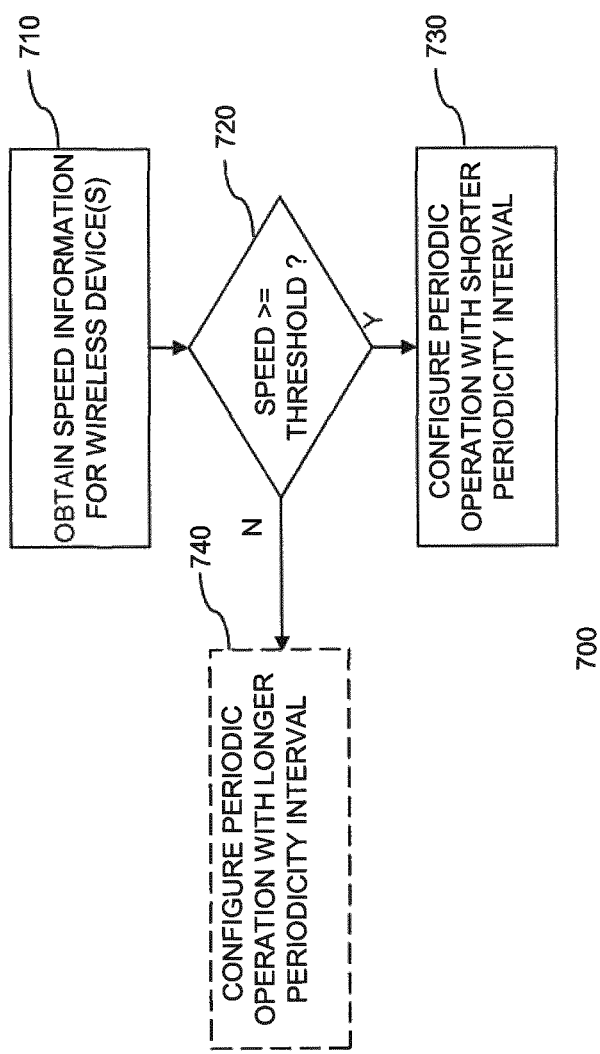
FIG. 7 shows a flow diagram of a first method embodiment.

FIG. 7 illustrates a flow diagram 700 of a method embodiment that can be performed by the network node 100 as discussed with reference to FIGS. 1, 2 and 4. The flow diagram 700 in certain variants executed in a loop for each wireless device 200 served by the network node 100 (e.g., to determine device-specific configurations pertaining to uplink signaling and/or device measurements). In other variants, the flow diagram 700 is performed in a loop that is aborted as soon as one wireless device 200 moving at a high speed has been found (e.g., in connection with determining network-specific configurations pertaining to downlink signaling).

In step 710, the network node 100 obtains speed information indicative of the speed of one or more of the wireless devices 200 in the wireless communication system. The speed information may be indicated by each or some of the wireless devices 200 to the network node 100. Alternatively, or in addition, the network node 100 may itself perform measurements to obtain the speed information.

In step 720, the network node 100 determines whether it is serving at least one wireless device 200 moving at a high speed. In more detail, the network node 100 determines, based on the speed information obtained in step 710, whether at least one of the one or more wireless devices 200 is moving at a speed at or above a speed threshold.

In step 720, or in another step, the network node 100 may also determine a set of periodic operations (e.g., pertaining to one or more of at least one downlink transmission, at least one uplink transmission and at least one measurement to be performed by one or more of the wireless devices 200) and associated (periodicity intervals that may need to be configured (or re-configured) in response to detecting in step 720 a wireless device 200 that moves at a high speed. This determination may be based on a pre-defined rule, it may be pre-configured and/or it may be based on an indication or explicit request from the wireless device 200.

If it is found in step 720 that there exists at least one wireless device 200 for which the speed threshold is reached or exceeded, the method proceeds to step 730 and configures the at least one periodic operation (e.g., the previously determined operation set) with a shorter periodicity interval compared to a regular or current interval setting. Otherwise, if it is found that there exists no wireless device 200 moving with a speed at or above the speed threshold, or if it is found that a particular wireless device 200 is not moving with a speed at or above the speed threshold, the method proceeds to an optional step 740. In step 740, the at least one periodic operation is configured with a longer periodicity interval compared to a high speed interval setting.

In a further step not illustrated in FIG. 7, the network node 100 may implement the configuration (e.g., perform downlink transmissions with the shorter periodicity interval) or command the wireless device(s) 200 to perform uplink transmissions and/or measurements or other operations with the shorter periodicity interval.

The periodicity interval in step 730 may adaptively be set dependent on the actual speed of the wireless device 200. As an example, the duration of the shorter periodicity interval may decrease with higher device speeds. This process may require defining two or more shorter periodicity intervals per periodic operation.

In case a shorter periodicity interval has been configured in step 730, the longer periodicity interval may be re-configured in case a particular one or all wireless devices 200 moving at a speed at or above the speed threshold are no longer served by the network node 100 (e.g., have left the cell 50 served by the network node 100). Such a re-configuration may also take place in case a particular one or all wireless devices 200 moving at a speed at or above the speed threshold has or have decelerated to now move at a speed below the speed threshold (to this end, the method illustrated in flow diagram 700 may repeatedly be performed for individual wireless devices 200).

In a further variant, the network node 100 may determine an activity state of each wireless device for which the method illustrated in flow diagram 700 is executed. The shorter interval may then be configured in step 730 also dependent on the activity state of the wireless device moving at a speed at or above the speed threshold. The activity state may include at least an idle state and an active state. For example, wireless devices in idle state may not be interested in receiving certain downlink signal transmissions, and these transmissions may thus not need to be configured in step 730 if all wireless devices moving at a speed at or above the speed threshold are found to be in the idle state.

Uplink transmissions and CSI- or measurement-related operations on the side of the wireless devices 200 may be configured differently for different wireless devices 200 in parallel. If, for example, the network node 100 serves a mixture of wireless devices 200 moving above and below the speed threshold, a short SRS periodicity interval may be configured for the wireless devices 200 moving at speeds above the speed threshold, and a long SRS periodicity interval may be configured for the wireless devices moving a speeds below the speed threshold.

The configuration implemented in step 730 and/or in step 740 may be indicated to the wireless device(s) 200 affected by the configuration. Moreover, or as an alternative, the network node 100 may indicate to the wireless devices 200 a relationship between periodicity intervals and device speeds for one or more periodic operations. The wireless devices 200 may then autonomously implement the suitable configuration. Moreover, or as a further alternative, the network node 100 may also indicate one or more speed thresholds to the wireless devices 200 for an autonomous thresholding (see also FIG. 8). Still further, the network node 100 may signal to individual wireless devices 200 if the network node 100 considers the respective wireless device 200 to move at a speed below or above a certain speed threshold (see also FIG. 8).

Figure 8:
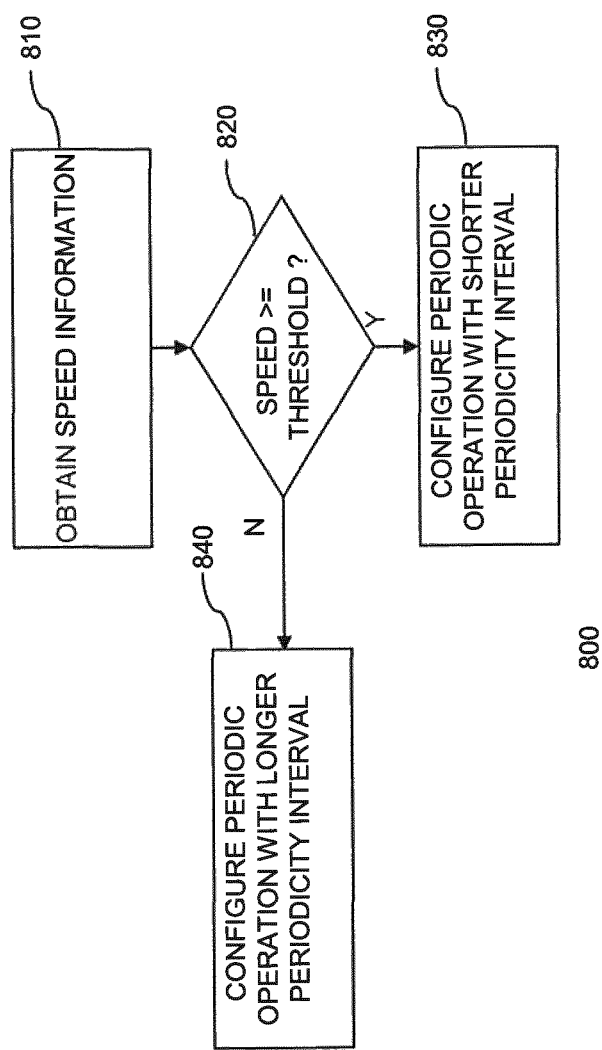
FIG. 8 shows a flow diagram of a second method embodiment.

FIG. 8 illustrates a flow diagram 800 of a method embodiment that can be performed by the wireless device 200 as discussed with reference to FIGS. 1, 3 and 5.

In step 810, the wireless device 200 obtains speed information indicative of its speed. The speed information may be received as an indication from the network node 100 (e.g., the device speed as such may be indicated or whether the network node 100 considers the wireless device 200 to move at a speed below or above a speed threshold). Alternatively, or in addition, the wireless device 200 may itself perform one or more measurements (including estimations) to obtain the speed information. The result of such measurements may be indicated to the network node 100 (see also step 710 in FIG. 7). In case the wireless device 200 obtains speed indications both from the network node 100 and autonomously (e.g., via measurements), it may process the different indications to arrive at the speed information to be used further. Such processing includes the application of functions (e.g., averaging functions), the selection of the maximum or minimum speed indication, the xth percentile, and so on.

In step 820, the wireless device 200 determines whether it is moving at a high speed. In more detail, the wireless device 200 determines, based on the speed information obtained in step 810, whether it is moving at a speed at or above a speed threshold In step 820, or in another step, the wireless device 200 may also determine a set of periodic operations (e.g., pertaining to one or more of at least one downlink transmission, at least one uplink transmission and at least one measurement to be performed by one or more of the wireless devices 200) and associated periodicity intervals that may need to be configured (or re-configured) in response to detecting in step 820 that it moves at a high speed. This determination may be based on a pre-defined rule, it may be pre-configured and/or it may be based on an indication or explicit request from the network node 100.

If it is found in step 820 that the speed threshold is reached or exceeded, the method proceeds to step 830 and configures the at least one periodic operation (e.g., the previously determined operation set) with a shorter periodicity interval compared to a regular or current interval setting. Otherwise, if it is found that the wireless device 200 is moving with a speed below the speed threshold, the method proceeds to an optional step 840. In step 840, the at least one periodic operation is configured with a longer periodicity interval compared to a high speed interval setting. The speed threshold may be pre-configured or it may be received as an indication from the network node 100. The configuration operations in steps 830 and 840 may be performed autonomously by the wireless device 200 or under control of configuration instructions (e.g., signalled relationships between periodicity interval settings and device speeds, and so on) received from the network node 100.

The periodicity interval configured in step 830 may adaptively be set dependent on the actual speed of the wireless device 200. As an example, the duration of the shorter periodicity interval may decrease with higher device speeds. This process may require defining two or more shorter periodicity intervals per periodic operation.

In case a shorter periodicity interval has been configured in step 830, the longer periodicity interval may be re-configured in case the wireless device 200 decelerates to move at a speed below the speed threshold. To this end, the method illustrated in flow diagram 800 may repeatedly be performed by the wireless device 200.

In a further step not illustrated in FIG. 8, the wireless device 200 may implement the configuration (e.g., perform measurements or uplink transmissions with the shorter periodicity interval).

Figure 9:
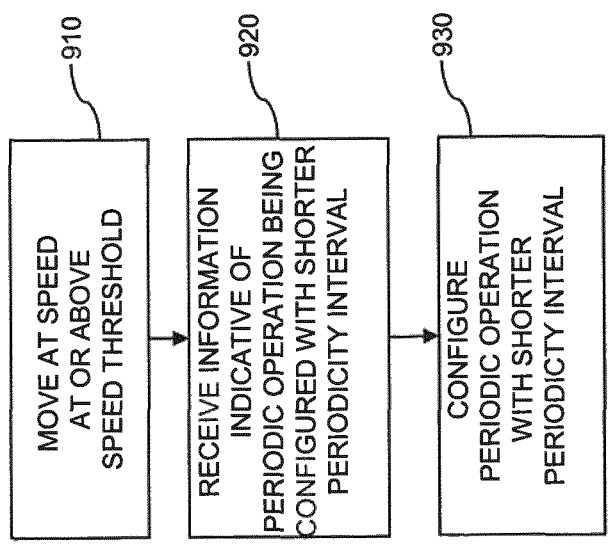
FIG. 9 shows a flow diagram of a third method embodiment.

FIG. 9 illustrates a flow diagram 900 of another method embodiment that can be performed by the wireless device 200 as discussed with reference to FIGS. 1, 3 and 6.

In step 910, the wireless device 200 accelerates to move at a speed at or above a speed threshold. This fact can be detected by the network node 100 as explained above in connection with FIG. 7 (see steps 710 and 720).

In step 920, the wireless device 200 receives, responsive to moving at a speed at or above the speed threshold and from the network node 100, information indicative of at least one periodic operation being configured with the shorter periodicity interval. As an example, the network node 100 may inform the wireless device 200 that a particular downlink transmission will occur at the shorter periodicity interval. Additionally, or as an alternative, the network node 100 may command the wireless device 200 to configure an uplink transmission, a measurement or another operation at the shorter periodicity interval.

Then, in step 930, the wireless device 200 may configure, responsive to receipt of the information in step 920, the at least one periodic operation with the shorter periodicity interval. As an example, the wireless device 200 may process a particular downlink transmission at the shorter periodicity interval. Additionally, or as an alternative, the wireless device 200 may configure an uplink transmission, a measurement or another operation at the shorter periodicity interval.

The method embodiments and individual steps as discussed above in connection with FIGS. 7 to 9 may be combined as needed. Also, the method embodiments may be performed in parallel. For example, some of the wireless devices 200 served by the network node 100 may operate in accordance with the method embodiment of FIG. 8, while other wireless devices 200 may operate in accordance with the method embodiment of FIG. 9.

As has become apparent from the above, in high speed deployments it would be beneficial for performance to use short periodicity intervals for certain signals and device activities due to the more rapidly varying radio environment.

For example, when serving high speed wireless devices 200, the network node or apparatus 100, 102 may use 40 ms periodicity for signals such as DRS, and when serving low speed wireless devices 200 it may use 120 ms or 160 ms. Increasing the periodicity interval allows power saving for both the network side and the wireless device 200 as the network side transmits the signal less frequently and the wireless device 200 is required to measure the signal less frequently. On the other hand, measurement delays are extended when signals are transmitted less frequently, so the resulting performance is not suitable for high speed scenarios.

According to one aspect discussed herein, the network side determines whether it is serving wireless devices 200 which are moving at high speed (e.g., at a speed above a speed threshold). The determination may be performed, for example, by measurement of an uplink signal from the wireless device 200 (such as Doppler frequency estimations), or using assistance information provided by the wireless device 200. Based on the determination by the network node 100 whether it is serving high speed wireless devices 200 or not, the network node 100 configures periodicity intervals of the signals and of measurement activities by wireless device 200.

According to another aspect discussed herein, a wireless device 200 either determines or is informed by the network side whether it is operating at high speed (e.g., at a speed above a speed threshold). Based on this determination it either performs measurement of at least one downlink periodic signal, or transmission of at least one uplink signal with a shorter periodicity interval (if it is operating at high speed) or a longer periodicity interval (if it is operating at lower speed).

It should be noted that two aspects may be used independently of each other. For example, if the network node 200 determines that it is serving at least one high speed wireless device 200, it may select a shorter periodicity interval for transmission of one or more periodic signals in the downlink. However, not all wireless devices 200 being served by the network node 200 may be operating at high speed, and hence a wireless device 200 operating at low speed (e.g., at a speed below a speed threshold) may still measure the downlink signal with a lower periodicity. For example, while the serving network node 200 may have internally configured DRS transmission to occur with a periodicity of 40 ms, some low speed wireless devices 200 may use 160 ms periodicity intervals to measure the DRS transmission.

The embodiments presented herein may be implemented based on rules that may be pre-defined (e.g., in an upcoming standard) and implemented by either one or both of the network node 100 and the wireless devices 200.

One exemplary rule is shown in the table of FIG. 10 for DRS and PRS signal transmissions. For high speeds (e.g., at or above a speed threshold of 300 km/h), the wireless device 200 and/or the network node 100 are/is required to use DRS with a shorter periodicity interval of 40 ms. For low speeds (i.e., below the speed threshold) the wireless device 200 and/or the network node 100 are/is required to use DRS with a longer periodicity interval of 80 ms or 160 ms.

The rule illustrated in the table of FIG. 10 may further be refined by defining different requirements associated with different periodic operations performed by the wireless devices 200 (e.g., RSRP/RSRQ measurements) under different speed ranges (e.g., as a function of the periodicity of the transmitted signals). Such different requirements may relate to different measurement periods as illustrated in the table of FIG. 11. At higher speeds (at or above the speed threshold of 300 km/h), the wireless device 200 is required to perform measurements (e.g., RSRP) over DRS with shorter periodicity intervals and this leads to a shorter measurement period (e.g., T0 for a DRS periodicity interval of 40 ms at 300 km/h or above, whereas 4*T0 is used for a DRS periodicity interval of 160 ms below 300 km/h).

In yet another example of a pre-defined rule illustrated in the table of FIG. 12, the performance requirements of wireless devices 200 for certain periodic operations are specified as a function of device speed regardless of the periodicity of, for example, the uplink signal transmission. In this example it is up to the wireless device 200 to selected the periodicity of the signal transmission while it has to meet one or more pre-defined performance requirements. In the table of FIG. 12, and in the table of FIG. 11, "N/A" denotes "not applicable".

In the following, further method embodiments will be discussed with reference to the flow diagrams of FIGS. 13 to 16. These further method embodiments may be based on the above embodiments.

Figure 13:
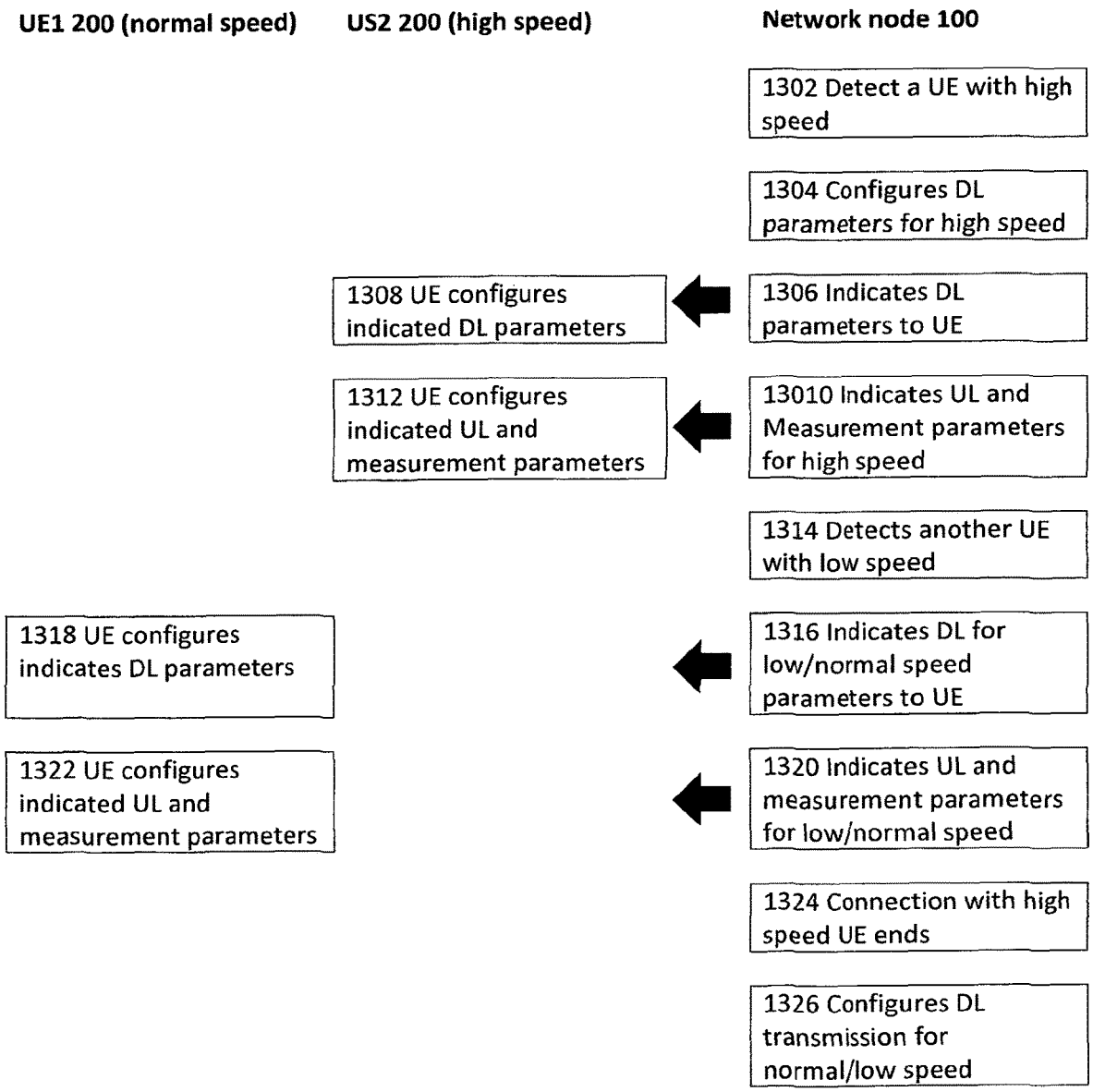
FIGS. 13 to 16 show flow diagrams of further method embodiments.

FIG. 13 illustrates a method in which a network node 100 is using existing signaling approaches. So, particular with regard to LTE and/or a 5G air interface building on LTE, in principle no standard changes are needed.

In step 1302, the network node 100 detects a wireless device 200 (UE2) with a speed at or above a speed threshold (see, e.g., FIG. 7) and configures in step 1304 parameters (including shorter periodicity intervals) for downlink transmissions accordingly. Also the parameters for uplink transmissions and/or measurements or other periodic device operations may be configured appropriately.

The corresponding downlink parameters are indicated in step 1306 to the corresponding wireless device 200 which, in step 1308, implements the associated shorter periodicity intervals for processing of the downlink signals. The corresponding uplink and measurement-related parameters are indicated in step 1310 to the corresponding wireless device 200 which, in step 1312, implements the associated shorter periodicity intervals for transmission of the uplink signals and other periodic operations.

In step 1314, the network node 100 detects another wireless device 200 (UE1) with a speed below the speed threshold (see, e.g., FIG. 7). The corresponding downlink parameters for low/normal speed are indicated in step 1316 to the corresponding wireless device 200 which, in step 1318, implements the associated longer periodicity intervals (compared the intervals applied by UE2) for processing of the downlink signals. The corresponding uplink and measurement-related parameters are indicated in step 1320 to the corresponding wireless device 200 which, in step 1322, implements the associated longer periodicity intervals (compared the intervals applied by UE2) for transmission of the uplink signals and other periodic operations. It should be noted that as the longer periodicity interval used for the downlink transmission is an integer multiple of the shorter periodicity intervals (see, e.g., tables in FIGS. 10 to 12), and since the intervals are synchronized, the low-speed wireless device 200 (UE1) can still properly process the corresponding downlink signals (although it will process, for example, only every second or fourth downlink signal that has been transmitted).

In step 1324 the network node 100 detects that the connection with the high speed wireless device 200 (UE2) has ended, for example because it (i.e., the wireless device 200) has left the cell served by the network node 100. Then, in step 1326, the downlink transmission is again re-configured in accordance with the longer periodicity interval.

Figure 14:
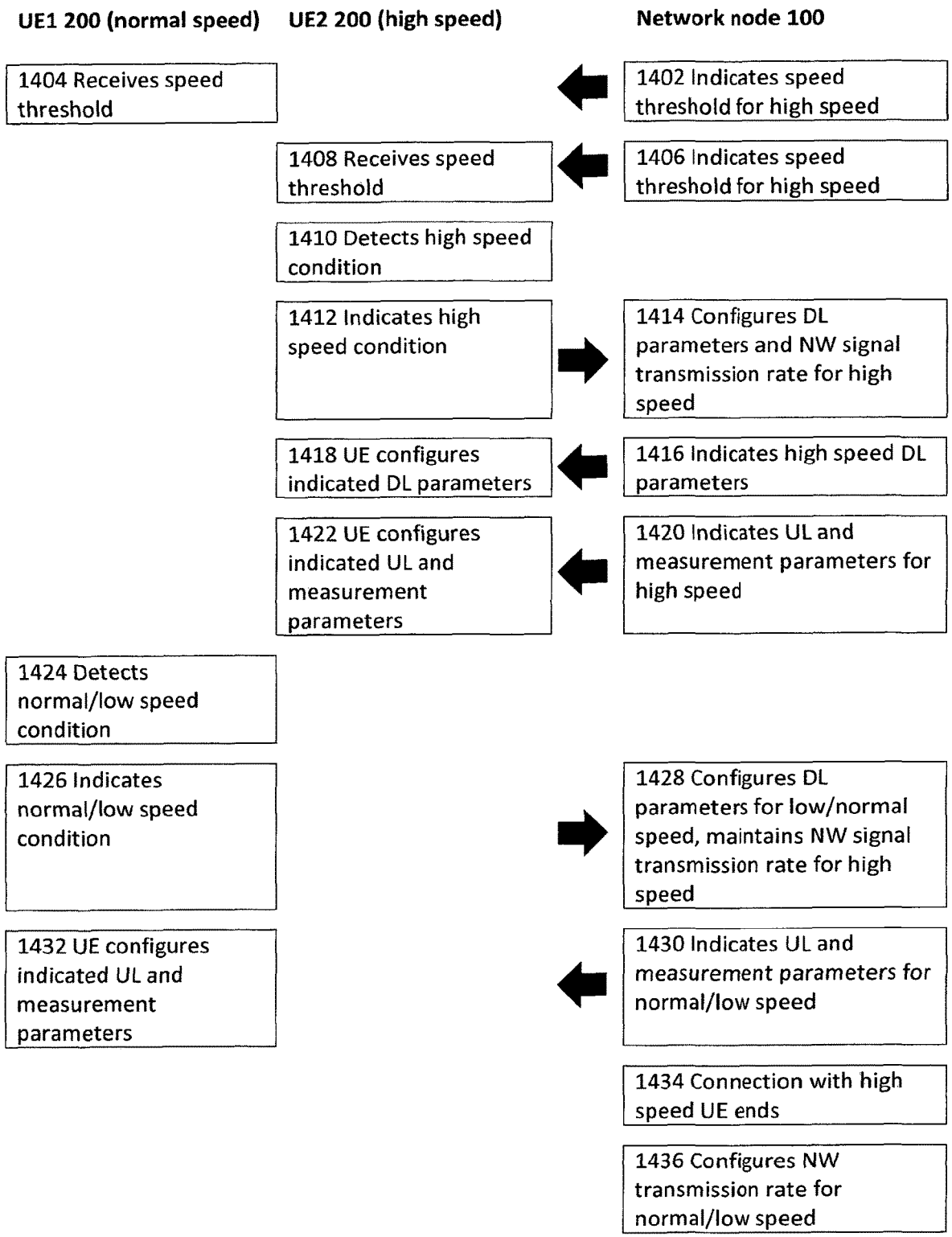

FIG. 14 illustrates a method in which the network node 100 configures the wireless devices 200 with speed thresholds. The wireless devices 200 provide high speed indications to the network node 100, so that the wireless devices 200 perform the speed measurements (rather than the network node 100). After the wireless devices 200 have indicated their speeds, the method proceeds as discussed above with reference to FIG. 13.

In steps 1402 and 1406, the network node 100 indicates at least one speed threshold to each of the wireless devices 200 (UE1 and UE2), which respectively receive the at least one speed threshold at steps 1404 and 1408. When one of the wireless devices 200 (UE2) detects a high speed condition (speed threshold is reached or exceeded) in step 1410, it indicates this to the network node 100 in step 1412. The remaining steps 1416-1422 in relation to that wireless device 200 are the same as discussed in the context of FIG. 13. When one of the wireless devices 200 (UE1) detects a normal/low speed condition (speed threshold is not reached) in step 1424, it indicates this to the network node 100 in step 1426. The remaining steps 1428-1436 in relation to that wireless device 200 are the same as discussed in the context of FIG. 13.

Figure 15:
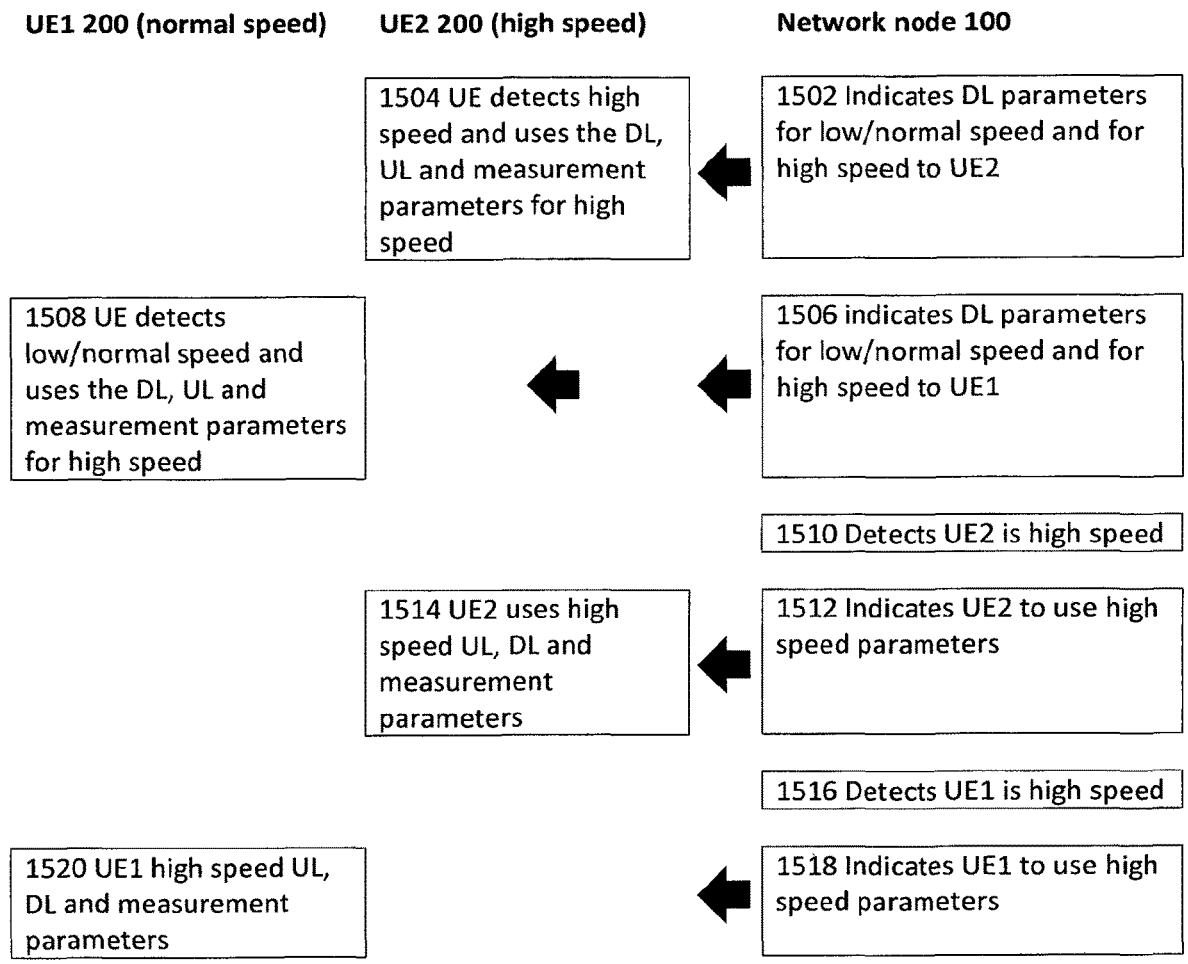

FIG. 15 illustrates a method in which the network node 100 determines the device speed. The difference between the methods of FIG. 13 and FIG. 15 is that the wireless devices 200 are configured with multiple periodicity interval parameter sets (e.g., one for low/normal speed and one for high speed and individually for one or more periodic operations), and that the network node 100 then indicates (after having performed speed estimation) which parameter set to use, or the wireless devices 200 apply the appropriate parameter set autonomously. This avoids the need to signal all parameter sets again, for example because the device speeds change.

In steps 1502 and 1506, the network node 100 indicates the parameter sets to the wireless devices 200 (UE1 and UE2). In step 1504 one of the wireless devices 200 (UE1) detects a high speed condition and uses the parameter set for this condition, and, in step 1508, another wireless device (UE2) detects a normal/low speed condition and uses the parameter set for this condition (see, e.g., FIG. 8 for more details). Alternatively, the network node 100 may detect the high speed condition for the wireless devices 200 in steps 1510 and 1516 and indicate to the wireless devices 200 to use the high speed parameter sets in steps 1512 and 1518, respectively (see, e.g., FIGS. 7 and 9 for more details). In steps 1514 and 1520, the high speed parameter sets are then used by the wireless devices.

Figure 16:
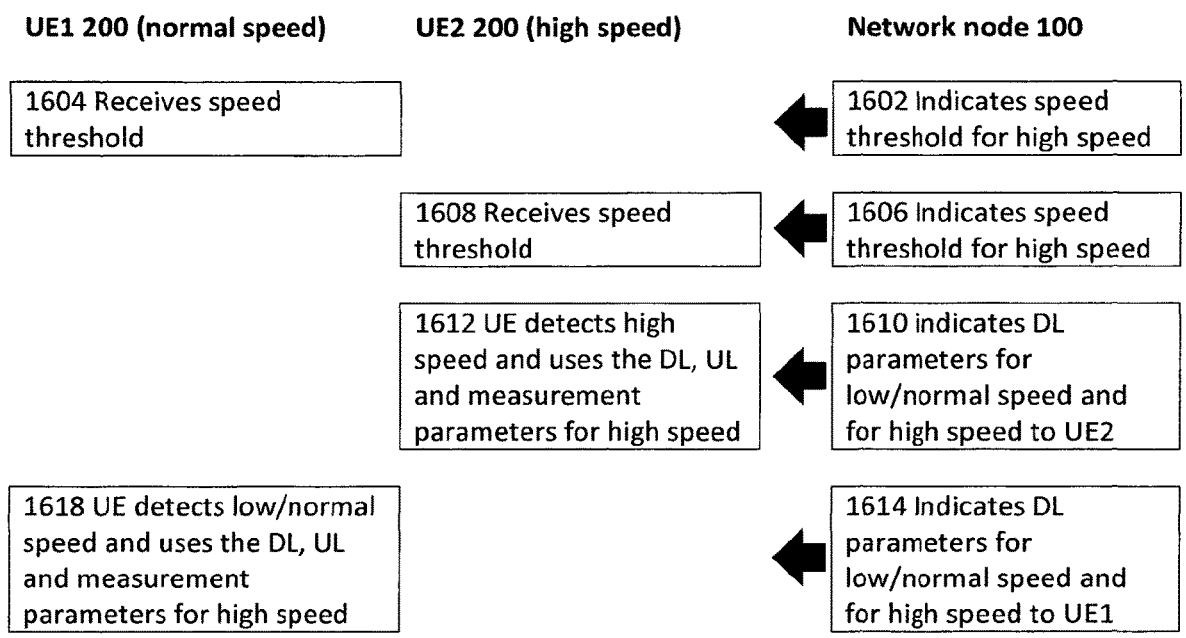

FIG. 16 illustrates a method in which the wireless devices 200 are pre-configured with a speed threshold by the network node 100 (see steps 1602 to 1608) and perform the speed measurement autonomously to autonomously implement the correct configuration (see steps 1612 and 1618) responsive to corresponding indications form the network node 100 (see steps 1610 and 1614). Details regarding the steps performed by the wireless devices 200 in this regard are illustrated in FIG. 8.

As has become apparent from the above description of exemplary embodiments, the solution in some cases allows better performance when wireless devices 200 are moving at high speed, while also allowing lower power consumption in both the network and the wireless device 200 when not moving at high speed.

As has also become apparent, multiple sets of downlink, uplink and measurement parameters may be used for uplink and downlink periodic signals and measurement activities (for low/normal speed wireless devices 200 a longer periodicity interval is respectively used, and for high speed wireless devices 200 a shorter periodicity interval is respectively used). The multiple parameter sets may be pre-configured in both the network and the wireless devices 200 such that the set in use can be quickly switched under either network or device control.

Moreover, further embodiments are discussed below. These further embodiments may be combined with any of the above embodiments or may be implemented separately therefrom. In these further embodiments, the following abbreviations are used:

RRM Radio Resource Management
DRX Discontinuous Reception
RLM Radio Link Monitoring
RRC Radio Resource Control
RF Radio Frequency
NW Network
RXTX Reception/Transmission
RLF Radio Link FailureCRS Cell Specific Reference Signal
DRS Discovery Reference Signal
RAT Radio Access Technology Moreover, further embodiments are discussed below. These further embodiments may be combined with any of the above embodiments or may be implemented separately therefrom. In these further embodiments, the following abbreviations are used:

| | |
|---|---|
| RRM | Radio Resource Management |
| DRX | Discontinuous Reception |
| RLM | Radio Link Monitoring |
| RRC | Radio Resource Control |
| RF | Radio Frequency |
| NW | Network |
| RXTX | Reception/Transmission |
| RLF | Radio Link FailureCRS    Cell Specific Reference Signal |
| DRS | Discovery Reference Signal |
| RAT | Radio Access Technology |

1 Introduction

In this contribution we discuss RRM requirement enhancements for high speed scenarios.

2 Discussion

2.1 Analysis of candidate solutions

Candidate solutions may be found from the study item technical report and there are the following solutions proposed for RRM in DRX for connected mode:

- Candidate solution 1: UEs would need to perform cell search and measurement more frequently than once per DRX cycle;

- Candidate solution 2: Enhance cell identification and measurement requirements in DRX for high speed scenarios (Huawei [R4-155792]);

- Candidate solution 3: Trigger the active measurements, e.g., the UE could increase the measurement activity if the serving cell RSRP falls below a certain threshold(Qualcomm [R4-156050]);

- Candidate solution 4: Network provides the assistant information to UE such that UE have different behaviour compared to the legacy UE (Intel);

- Candidate solution 5: Enhanced RRM requirements are defined up to the upper bound DRX cycle (Nokia [R4-155854]).

- Candidate solution 6: Enhance RRM requirements based on the estimated UE relative distance changes by the use of previous UE measurements at previous DRX ON durations (Alcatel-Lucent [R4-158183.zip]).

- Candidate solution 7: Reduce RLM (out of sync monitoring) window and RLF timers to enable quick RRC re-establishments in the target cell (Qualcomm [R4-157272])

As discussed in

Candidate solution 1: UEs would need to perform cell search and measurement more frequently than once per DRX cycle

It is clear that the additional cell search and measurement would imply worse power consumption than an implementation that measures once per DRX. Since the NW can already configure different DRX cycles, it is already possible to configure more frequent measurements, with the additional benefit that the scheduling opportunities to the UE are increased, and all UE from release 8 onwards can be configured in this way to give better RRM minimum performance. The question which needs to be asked is whether the baseband PDCCH decoding is a highly significant part of the overall power consumption when the UE wakes up from sleep to receive (and measure), such that there would be benefit in assuming some wake ups from sleep do not involve PDCCH decoding. In our understanding, the impact of PDCCH decoding is relatively small when the RF needs to be started, and the baseband needs to be clocked and operating searcher, so we do not see a significant benefit of candidate solution 1.

Proposal 1 (Candidate solution 1): Candidate solution 1 is not evaluated further

Candidate solution 2: Enhance cell identification and measurement requirements in DRX for high speed scenarios (Huawei [R4-155792]):

We evaluate further this solution in this contribution; in short we think it would be beneficial to enhance requirements.

Proposal 2 (Candidate solution 2) : Cell identification and measurement requirements in DRX for high speed scenarios are enhanced

Candidate solution 3: Trigger the active measurements, e.g., the UE could increase the measurement activity if the serving cell RSRP falls below a certain threshold(Qualcomm [R4-156050]):

One drawback of this solution is that it takes a 2 stage process to trigger faster measurements. We assume that under this proposal, if serving RSRP is good, all cells are measured once per DRX cycle and if serving cell is poor all cells are measured more frequently. This does address the power consumption concern of candidate solution 1; on the other hand the difficulty is that if there is a sudden degradation in serving cell, this is not noticed by the UE for approximately one measurement period, at which point the faster measurements are triggered. The proposal assumes that measurements change in a relatively gradual manner such that it is possible to configure a threshold to trigger the faster measurements before they are needed and still have time to do this. While the proposal could work in certain scenarios, it does not seem particularly robust to have the UE switching measurement rate and it is questionable how well it would work in practical high speed train deployments. Of course, even if the faster measurements are not triggered the measurement rate should be the same as that implied by current requirements, so in that sense the performance will not be harmed under this proposal but on the other hand, if the switching does not work robustly, then the options from a NW perspective are either to configure a higher switching threshold (which makes the proposal work more like candidate solution 1) or to configure a shorter DRX cycle to get faster measurements (which is already possible without this enhancement). For this reason, we prefer to concentrate on other candidate solutions.

Proposal 3 (Candidate solution 3) : Candidate solution 3 is not evaluated further

Candidate solution 4: Network provides the assistant information to UE such that UE have different behaviour compared to the legacy UE (Intel);

Our assumption with this candidate solution is that the assistant information means that the enhanced DRX requirements are explicitly enabled by signalling. Since it is likely that high speed requirements will be more demanding and are not necessary in other scenarios, our view is that this would be beneficial. Since this seems to be fully complimentary to other candidate solutions we think it could be adopted, although perhaps a final check should be made once the other solutions for the work item have been selected. For instance, if the power consumption impact of the other solutions is very small and they have no other drawbacks in non-high speed operation, the higher layer signalling would not be needed. We think however that this outcome is not very likely, and candidate solution 4 could be taken as a working assumption.

Proposal 4 (Candidate solution 4) : Candidate solution 4 is taken as a working assumption

Candidate solution 5: Enhanced RRM requirements are defined up to the upper bound DRX cycle (Nokia [R4-155854]).

This was discussed in more detail in RAN4#78. The motivation is that certain RRC connected DRX cycles would not be suitable for high speed train scenarios, and therefore are not beneficial to enhance. The main aspect which needs to be considered is which DRX cycles to exclude. Our analysis for idle mode indicates that reselection would be possible at 350km/h for 1.28s and 2.56s DRX cycles. Our expectation is that it would also be possible to use network controlled mobility with the same DRX cycles

Proposal 5 (candidate solution 5) : The upper bound for candidate solution 5 is to include at least DRX cycles up to and including 2.56s

Candidate solution 6: Enhance RRM requirements based on the estimated UE relative distance changes by the use of previous UE measurements at previous DRX ON durations (Alcatel-Lucent [R4-158183.zip])

This candidate solution appears to be based on applying an estimate of UE relative distance that will be moved using a pathloss model. For example, if the UE estimates that it is moving at relative speed of 350km/h away from a cell then it knows that it will travel approximately 125 meters further from the cell during a 1.28s DRX off duration. Hence, the additional pathloss could be considered and if this pathloss would trigger a handover then the event could (for example) be reported early. Relative distance is considered for all cell measurements, not just the serving cell, and the relative distance may be estimated using e.g. pathloss modelling, RXTX time difference (for serving cell), RSTD or Doppler frequency estimation.

Introducing distance change compensation to measurements complicates the measurements considerably, so we think some caution is needed before introducing a scheme were measurements are not just based values directly measured from the downlink signals. Especially testing of the candidate solution appears difficult and it would need to be verified how well it improves the situation, given that the distance estimation will, itself, be subject to uncertainties. Modelling of distance change using a pathloss model also corresponds to making assumptions regarding the propagation which are not always valid. In addition it does not address cell identification which we think is one of the most limiting aspects for high speed train mobility. Hence we propose

Proposal 6 (candidate solution 6) : Candidate solution 6 is not studied further.

<u>Candidate solution 7: Reduce RLM (out of sync monitoring) window and RLF timers to enable quick RRC re-establishments in the target cell (Qualcomm [R4-157272])</u>

This candidate solution is somewhat different from others, in that it does not seek to reduce the incidence of radio link failure, but attempts to enable faster recovery once RLF occurs. Certainly, if the UE detects that conditions are below Qout (out of sync) it is less likely that conditions will improve if the UE is moving with high speed compared with the non-high speed case, and so there does seem to be some justification for reducing the out of sync monitoring window. On the other hand, a shorter window will imply a less accurate decision that the UE is out of sync. The idea therefore needs further evaluation do determine how much shortening should be considered. In addition, changed RLM/RLF behaviour may cause difficulties in non-high speed scenarios, so we think that it may be important that if considered, this candidate solution is combined with candidate solution 4 (assistant signalling) so that the shortened out of sync monitoring window and quicker RRC reestablishment is introduced under NW control.

Proposal 7 (candidate solution 7) : Candidate solution 7 is studied further, under the assumption that it would be network controlled.

2.2 Work item scope

The study item on high speed scenarios and the first discussions of the work item have been focussed on DRX measurements and primarily on release 8 functionality. There are, however, LTE-A and other features which have DRX-like performance requirements, and which should, in our view, be considered in the scope of the work item along with DRX measurement. Some of the relevant areas are
- Deactivated SCell measurement requirements
- DRS based measurements. Although DRS could be used in small cells, it may also be relevant to consider the usage in macro cells e.g. to reduce CRS transmission overhead.

We think it would be beneficial to include at least these areas within the scope of the work on high speed requirements. RAN4 could also discuss if there are other areas which need to be considered in the requirements work.

Proposal 8 : The work item scope includes at least deactivated Scell measurements and DRS based measurements

2.3 Enhancement proposals

Having considered the various candidate solutions we now turn our attention to evaluating proposal 2 in more detail. When DRX RRM requirements were developed for LTE in release 8, the starting point was idle mode mobility performance, since it could be assumed that autonomous reselection and network controlled mobility have similar delay requirements to maintain a connection to the serving cell. The following differences may be noted:

- $T_{detect,EUTRAN\_Intra}$ in idle mode is given by $(20+T_{evaluate})$ DRX cycles, whereas for RRC connected DRX cycles, $T_{identify\_intra}$ is 20DRX cycles <u>including</u> measurement period, at least for RRC connected DRX cycles >0.128s.
- $T_{evaluate,EUTRAN\_Intra}$ in idle mode is between $3*T_{measure,EUTRAN\_Intra}$ and $5*T_{measure,EUTRAN\_Intra}$ whereas a fixed $T_{measure,EUTRAN\_Intra}$ of duration 5 DRX cycles is specified
- In RRC connected mode it is assumed that the UE measures on every DRX cycle; whereas for idle mode with 320ms and 640ms DRX cycles, $T_{measure,EUTRAN\_Intra}$ is 4 or 2 DRX cycles
- Deactivated SCell measurements are very similar to DRX requirements, with $T_{identify\_scc} = 20$ *measCycleSCell* and $T_{measure\_scc} = 5$ *measCycleSCell*

When release 8 requirements were developed RAN4 explicitly discussed reuse of idle requirements to develop the corresponding connected requirements and we think it would be good to keep this alignment when high speed train enhancements are also considered.

In a companion contribution we discuss RRM requirements for idle mode[3], including consideration of practical implementation aspects. Very similar considerations apply for power consumption in RRC connected state with DRX, since the UE wakes up on a periodic basis. Therefore we propose that for connected state.

Proposal 9 : A requirement for single shot detection (excluding evaluation period) when there is sufficient SINR (exact Es/Iot FFS) would be specified

In practice the requirement could be captured by adding the measurement period (e.g. if 3 DRX measurement period is specified (see proposal 10) then the detection requirement at high SINR is 4DRX cycles

Proposal 10 : RAN4 should discuss the assumptions to be used, however enhanced performance with a basic identification time in idle mode of around 5DRX cycles is feasible for $-6dB \leq SINR < 0dB$ .

In practice the requirement could be captured by adding the measurement period (e.g. if 3 DRX measurement period is specified (see proposal 10) then the detection requirement at low SINR is 8DRX cycles

Proposal 11 : $T_{evaluate}$ = 3DRX cycle is specified for all DRX cycles for high speed scenarios

Proposal 12 Signalling is used to enable the enhanced performance requirements.

For connected UEs, one option is that the signalling could be provided via dedicated signalling rather than broadcast.

Proposal 13 : Intrafrequency requirements are the top priority for enhancement

Similarly to the discussion for idle mode requirements we are not against enhancement of interfrequency or interRAT requirements but we see that the most likely practical use cases for mobility are intra-frequency cases. One reason is that interfrequency or interRAT mobility is dependent on measurement gaps, at least for some UEs. So the activation of inter-frequency measurements is a 2 step process (gaps are typically activated based on serving cell measurements) and more likely to fail than intra-frequency measurements which may be performed all the time.

3 Conclusions

Proposal 1 (Candidate solution 1): Candidate solution 1 is not evaluated further

Proposal 2 (Candidate solution 2) : Cell identification and measurement requirements in DRX for high speed scenarios are enhanced

Proposal 3 (Candidate solution 3) : Candidate solution 3 is not evaluated further

Proposal 4 (Candidate solution 4) : Candidate solution 4 is taken as a working assumption

Proposal 5 (candidate solution 5) : The upper bound for candidate solution 5 is to include at least DRX cycles up to and including 2.56s

Proposal 6 (candidate solution 6) : Candidate solution 6 is not studied further.

Proposal 7 (candidate solution 7): Candidate solution 7 is studied further, under the assumption that it would be network controlled.

Proposal 8: The work item scope includes at least deactivated Scell measurements and DRS based measurements

Proposal 9: A requirement for single shot detection (excluding evaluation period) when there is sufficient SINR (exact Es/Iot FFS) would be specified

Proposal 10: RAN4 should discuss the assumptions to be used, however enhanced performance with a basic identification time in idle mode of around 5DRX cycles is feasible for $-6dB \leq SINR < 0dB$.

Proposal 11: $T_{evaluate}$ = 3DRX cycle is specified for all DRX cycles for high speed scenarios

Proposal 12 Signalling is used to enable the enhanced performance requirements.

Proposal 13: Intrafrequency requirements are the top priority for enhancement

4 Reference

[1] RP-152263, "New WI proposal: Performance enhancements for high speed scenario", NTT DOCOMO, INC., Huawei, HiSilicon

[2] R4-160533 "Considerations on mobility in RRC Idle state for high speed train", Ericsson

[3] R4-16xxxx, "RRM requirements for RRC idle mode in high speed scenarios", Ericsson Many advantages of the present invention will be fully understood from the foregoing description, and it will be apparent that various changes may be made in the form, construction and arrangement of the steps, units and devices described above and without departing from the scope of the invention or without sacrificing all of its advantages. Since the invention can be varied in many ways, it will be recognized that the invention should be limited only by the scope of the following embodiments.

Many advantages of the present invention will be fully understood from the foregoing description, and it will be apparent that various changes may be made in the form, construction and arrangement of the steps, units and devices described above and without departing from the scope of the invention or without sacrificing all of its advantages. Since the invention can be varied in many ways, it will be recognized that the invention should be limited only by the scope of the following embodiments.

The invention claimed is:

1. A method of configuring at least one periodic operation in a wireless communication system comprising a plurality of wireless devices and a serving network serving the plurality of wireless devices, wherein the periodic operation is selectively configurable at one of a shorter periodicity interval and a longer periodicity interval, the method being performed by the serving network and comprising:
    obtaining speed information indicative of a speed of one or more of the wireless devices in the wireless communication system;
    determining, based on the speed information, whether at least one of the one or more wireless devices is moving at a speed at or above a speed threshold;
    configuring, if it is determined that at least one of the one or more wireless devices is moving at a speed at or above the speed threshold, the at least one periodic operation with the shorter periodicity interval;
    determining an activity state of at least one wireless device moving at a speed at or above the speed threshold; and selecting the at least one periodic operation that is to be configured dependent on the activity state, wherein the speed threshold depends on the activity state of the at least one wireless device, wherein the activity state comprises one of an idle mode or an active mode,
    wherein the at least one periodic operation is at least one of a periodic transmission of a downlink signal and a periodic transmission of an uplink signal.

2. The method of claim 1, wherein the longer periodicity interval is an integer multiple of the shorter periodicity interval.

3. The method of claim 1, further comprising:
    configuring, if it is determined that the at least one wireless device is or all wireless devices are moving at a speed or below the speed threshold, the periodic operation with the longer periodicity interval.

4. The method of claim 1, wherein the at least one periodic operation is the periodic transmission of the downlink signal by the serving network, and further comprising triggering a periodic transmission of the downlink signal with the configured periodicity interval.

5. The method of claim 4, wherein the downlink signal is selected from the following signals: a discovery signal, a reference signal, a synchronization signal, a system information signal.

6. The method of claim 1, wherein the at least one periodic operation is the periodic transmission of the uplink signal sent by the at least one wireless device.

7. The method of claim 6, wherein the uplink signal is selected from the following signals: a reference signal, a report signal.

8. The method of claim 1, further comprising:
    triggering transmission of information indicative of a relationship between periodicity intervals and device speeds for the at least one periodic operation to the wireless devices.

9. A method of configuring at least one periodic operation in a wireless communication system comprising a plurality of wireless devices and a serving network serving the plurality of wireless devices, wherein the periodic operation is selectively configurable at one of a shorter periodicity interval and a longer periodicity interval, the method being performed by a wireless device and comprising:
    obtaining speed information indicative of a speed of the wireless device;
    determining, based on the speed information, whether the wireless device is moving at a speed at or above a speed threshold;
    configuring, if it is determined that the wireless device is moving at a speed at or above the speed threshold, the at least one periodic operation with the shorter periodicity interval;
    determining an activity state of the wireless device moving at a speed at or above the speed threshold; and selecting the at least one periodic operation that is to be configured dependent on the activity state, wherein the speed threshold depends on the activity state of the wireless device, wherein the activity state comprises one of an idle mode or an active mod;
    wherein the at least one periodic operation is at least one of a periodic processing of a received downlink signal and a periodic transmission of an uplink signal.

10. The method of claim 9, wherein the longer periodicity interval is an integer multiple of the shorter periodicity interval.

11. The method of claim 9, further comprising:
    configuring, if it is determined that the wireless device is moving at a speed or below the speed threshold, the periodic operation with the longer periodicity interval.

12. The method of claim 9, wherein obtaining the speed information comprises receiving the speed information from the serving network, and/or wherein obtaining the speed information comprises performing a measurement of a speed-related parameter.

13. The method of claim 9, wherein the at least one periodic operation is the periodic processing of a downlink signal received from the serving network, or wherein the at least one periodic operation is the periodic transmission of the uplink signal by the wireless device.

14. The method of claim 9, wherein the at least one periodic operation is the periodic transmission of the uplink signal by the wireless device, and wherein the uplink signal is selected from the following signals: a reference signal, a report signal.

15. The method of claim 9, further comprising:
    receiving information indicative of a relationship between periodicity intervals and device speeds for the at least one periodic operation from the serving network.

16. A network apparatus configured to configure at least one periodic operation in a wireless communication system comprising a plurality of wireless devices and a serving network serving the plurality of wireless devices, wherein the periodic operation is selectively configurable at one of a shorter periodicity interval and a longer periodicity interval, the network apparatus comprising at least one memory containing instructions that, when executed by at least one processor, cause the network apparatus to operate to:
    obtain speed information indicative of a speed of one or more of the wireless devices in the wireless communication system;
    determine, based on the speed information, whether at least one of the one or more wireless devices is moving at a speed at or above a speed threshold;

configure, if it is determined that at least one of the one or more wireless devices is moving at a speed at or above the speed threshold, the at least one periodic operation with the shorter periodicity interval;

determine an activity state of at least one wireless device moving at a speed at or above the speed threshold; and select the at least one periodic operation that is to be configured dependent on the activity state, wherein the speed threshold depends on the activity state of the at least one wireless device, wherein the activity state comprises one of an idle mode or an active mode, wherein the at least one periodic operation is at least one of a periodic transmission of a downlink signal and a periodic transmission of an uplink signal.

17. A wireless device configured to configure at least one periodic operation in a wireless communication system comprising a plurality of wireless devices and a serving network serving the plurality of wireless devices, wherein the at least one periodic operation is selectively configurable at one of a shorter periodicity interval and a longer periodicity interval, the wireless device comprising at least one memory containing instructions that, when executed by at least one processor, cause the wireless device to operate to:

obtain speed information indicative of a speed of the wireless device;

determine, based on the speed information, whether the wireless device is moving at a speed at or above a speed threshold;

configure, if it is determined that the wireless device is moving at a speed at or above the speed threshold, the at least one periodic operation with the shorter periodicity interval;

determine an activity state of the wireless device moving at a speed at or above the speed threshold; and select the at least one periodic operation that is to be configured dependent on the activity state, wherein the speed threshold depends on the activity state of the wireless device, wherein the activity state comprises one of an idle mode or an active mode, wherein the at least one periodic operation is at least one of a periodic processing of a received downlink signal and a periodic transmission of an uplink signal.

18. A wireless device configured to configure at least one periodic operation in a wireless communication system comprising a plurality of wireless devices and a serving network serving the plurality of wireless devices, wherein the periodic operation is selectively configurable at one of a shorter periodicity interval and a longer periodicity interval, the wireless device comprising at least one memory containing instructions that, when executed by at least one processor, cause the wireless device to:

detect that the wireless device moves at a speed at or above a speed threshold;

responsive to detecting that the wireless device moves at a speed at or above the speed threshold, receive, from the serving network information indicative of the at least one periodic operation being configured with the shorter periodicity interval;

configure, responsive to receipt of the information, the at least one periodic operation with the shorter periodicity interval;

determine an activity state of the wireless device moving at a speed at or above the speed threshold; and select the at least one periodic operation that is to be configured dependent on the activity state, wherein the speed threshold depends on the activity state of wireless device, wherein the activity state comprises one of an idle mode or an active mode, wherein the at least one periodic operation is at least one of a periodic processing of a received downlink signal and a periodic transmission of an uplink signal.

* * * * *